(12) United States Patent
Shigemura et al.

(10) Patent No.: US 7,381,444 B2
(45) Date of Patent: Jun. 3, 2008

(54) COLOR FILTER MANUFACTURING METHOD AND APPARATUS, INK-JET DEVICE, COLOR FILTER, DISPLAY DEVICE, AND APPARATUS HAVING DISPLAY DEVICE

(75) Inventors: Yoshihiro Shigemura, Yokohama (JP); Nobuhito Yamaguchi, Tokyo (JP); Hideto Yokoi, Yokohama (JP); Satoshi Wada, Tokyo (JP); Hiroshi Fujiike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/449,813

(22) Filed: Jun. 9, 2006

(65) Prior Publication Data

US 2006/0228469 A1 Oct. 12, 2006

Related U.S. Application Data

(62) Division of application No. 10/924,936, filed on Aug. 25, 2004, now Pat. No. 7,270,846, which is a division of application No. 08/679,979, filed on Jul. 15, 1996, now Pat. No. 6,874,883.

(30) Foreign Application Priority Data

| Jul. 19, 1995 | (JP) | ................................... 7-182560 |
| Jul. 26, 1995 | (JP) | ................................... 7-190091 |
| Sep. 4, 1995 | (JP) | ................................... 7-226443 |
| Sep. 14, 1995 | (JP) | ................................... 7-236781 |
| Jul. 4, 1996 | (JP) | ................................... 8-175189 |

(51) Int. Cl.
*B05D 5/06* (2006.01)

(52) U.S. Cl. ...................... 427/162; 427/164; 427/165; 427/256; 427/287; 347/12; 347/13; 347/40; 347/42; 347/43; 347/22; 347/24; 347/30; 347/37; 347/39

(58) Field of Classification Search ................. 427/162, 427/164, 165, 256, 287; 347/12, 13, 40, 347/42, 43, 22, 30, 37, 39
See application file for complete search history.

(56) References Cited

U.S. PATENT DOCUMENTS 4,313,124 A 1/1982 Hara ........................... 347/57

(Continued)

FOREIGN PATENT DOCUMENTS

EP 0 443 808 8/1991

(Continued)

*Primary Examiner*—Alain L. Bashore
(74) *Attorney, Agent, or Firm*—Fitzpatrick, Cella, Harper & Scinto

(57) ABSTRACT

A color filter manufacturing apparatus of this invention includes a plurality of ink-jet heads (120a, 120b, 120c) each having a first ink discharging nozzle group (108) in which the pitch of a plurality of ink discharging nozzles in the Y-axis direction is set to be equal to the pitch of pixels of the same color in the Y-axis direction, and a second ink discharging nozzle group having a nozzle pitch set to be equal to the pixel pitch in the Y-axis direction like the first ink discharging nozzle group. Control of an ink discharging operation is performed for only one of the first and second ink discharging nozzle groups which is to be used to color pixels of corresponding colors on a substrate (1).

10 Claims, 26 Drawing Sheets

U.S. PATENT DOCUMENTS

| | | | |
|---|---|---|---|
| 4,712,172 A | 12/1987 | Kiyohara et al. | 346/1.1 |
| 4,963,882 A | 10/1990 | Hickman | 347/41 |
| 4,970,527 A | 11/1990 | Gatten | 346/1.1 |
| 5,075,689 A | 12/1991 | Hoisington et al. | 347/41 |
| 5,109,233 A | 4/1992 | Nishikawa | 346/1.1 |
| 5,281,450 A | 1/1994 | Yaniv | 427/510 |
| 5,285,298 A | 2/1994 | Kaneko et al. | 359/43 |
| 5,455,608 A | 10/1995 | Stewart et al. | 347/23 |
| 5,576,070 A | 11/1996 | Yaniv | 427/510 |
| 5,681,675 A | 10/1997 | Kurauchi et al. | 430/20 |
| 5,726,724 A | 3/1998 | Shirota et al. | 349/106 |
| 5,956,056 A | 9/1999 | Kaneko et al. | 347/43 |
| 6,086,185 A | 7/2000 | Inui et al. | 347/43 |
| 6,145,981 A | 11/2000 | Akahira et al. | 347/107 |

FOREIGN PATENT DOCUMENTS

| | | |
|---|---|---|
| EP | 0 471 488 | 2/1992 |
| EP | 0 546 838 | 6/1993 |
| EP | 0 585 923 | 3/1994 |
| EP | 0 589 581 | 3/1994 |
| EP | 0 595 658 | 5/1994 |
| EP | 0 622 202 | 11/1994 |
| EP | 0 660 159 | 6/1995 |
| EP | 0 683 406 | 11/1995 |
| JP | 54-158232 | 12/1979 |
| JP | 59-75205 | 4/1984 |
| JP | 60-41002 | 3/1985 |
| JP | 60-104335 | 6/1985 |
| JP | 60-104338 | 6/1985 |
| JP | 63-294503 | 4/1988 |
| JP | 63-235901 | 9/1988 |
| JP | 1-217320 | 8/1989 |
| JP | 5-301379 | 11/1993 |
| JP | 6-198916 | 7/1994 |
| JP | 6-246931 | 9/1994 |
| JP | 7-146406 | 6/1995 |
| JP | 8-086913 | 4/1996 |
| JP | 8-179307 | 7/1996 |

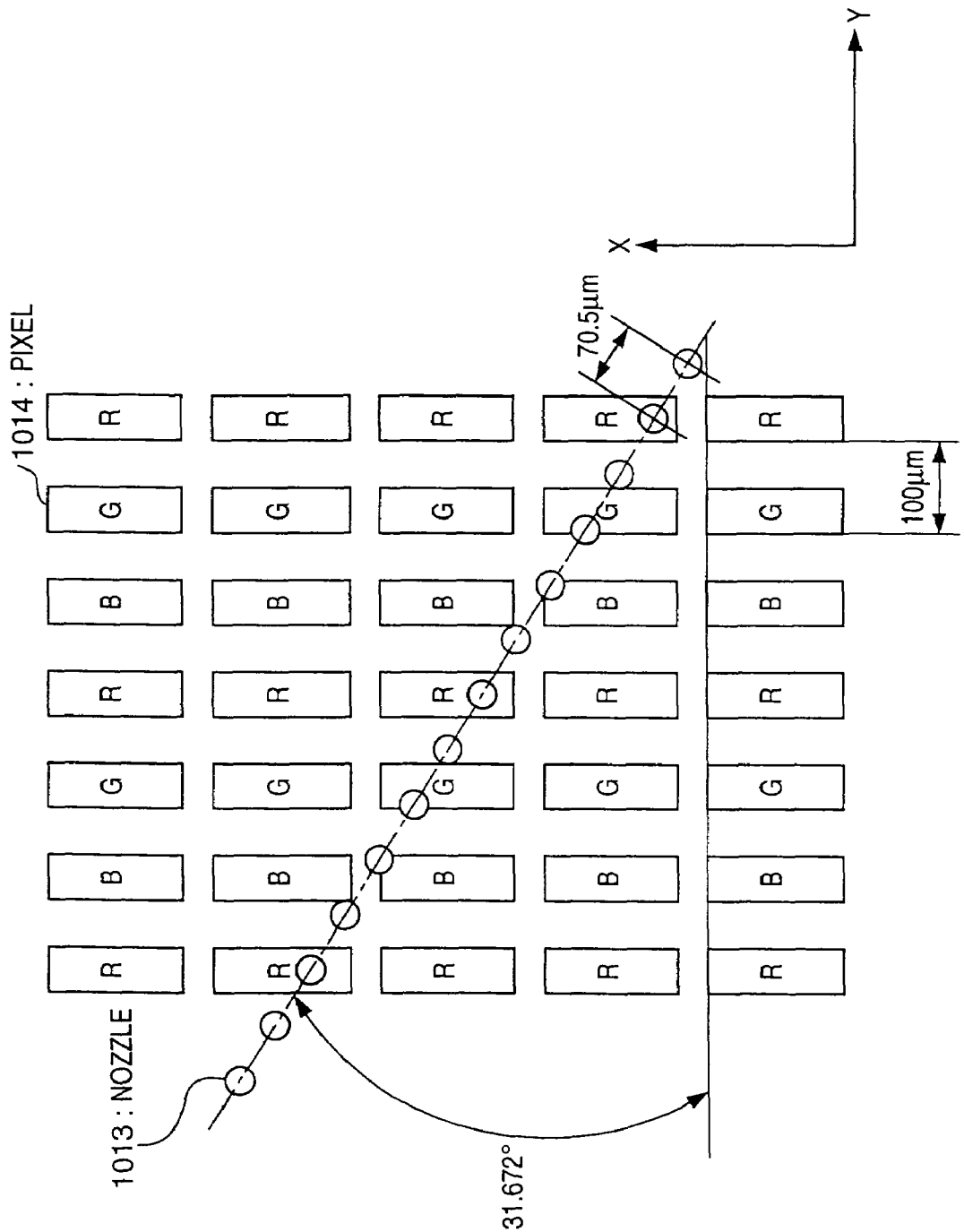

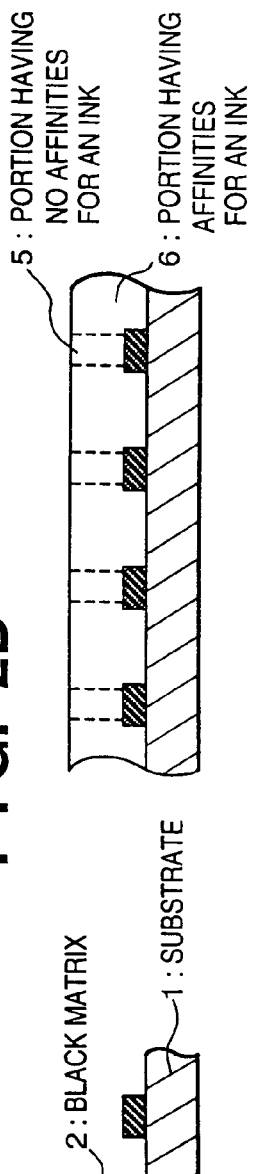
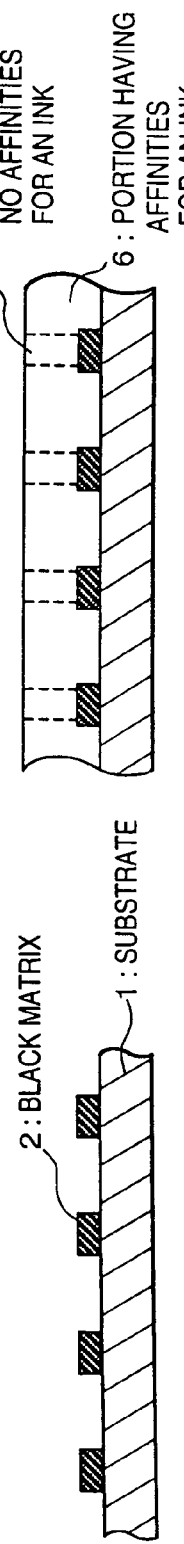
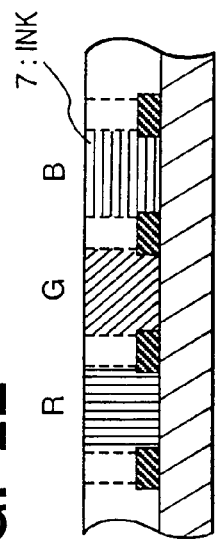
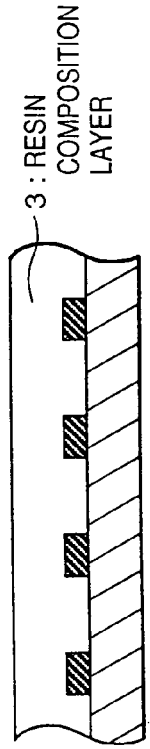
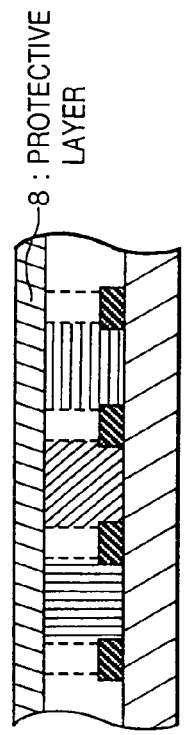
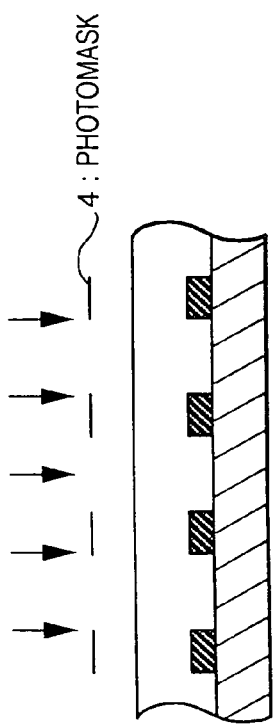

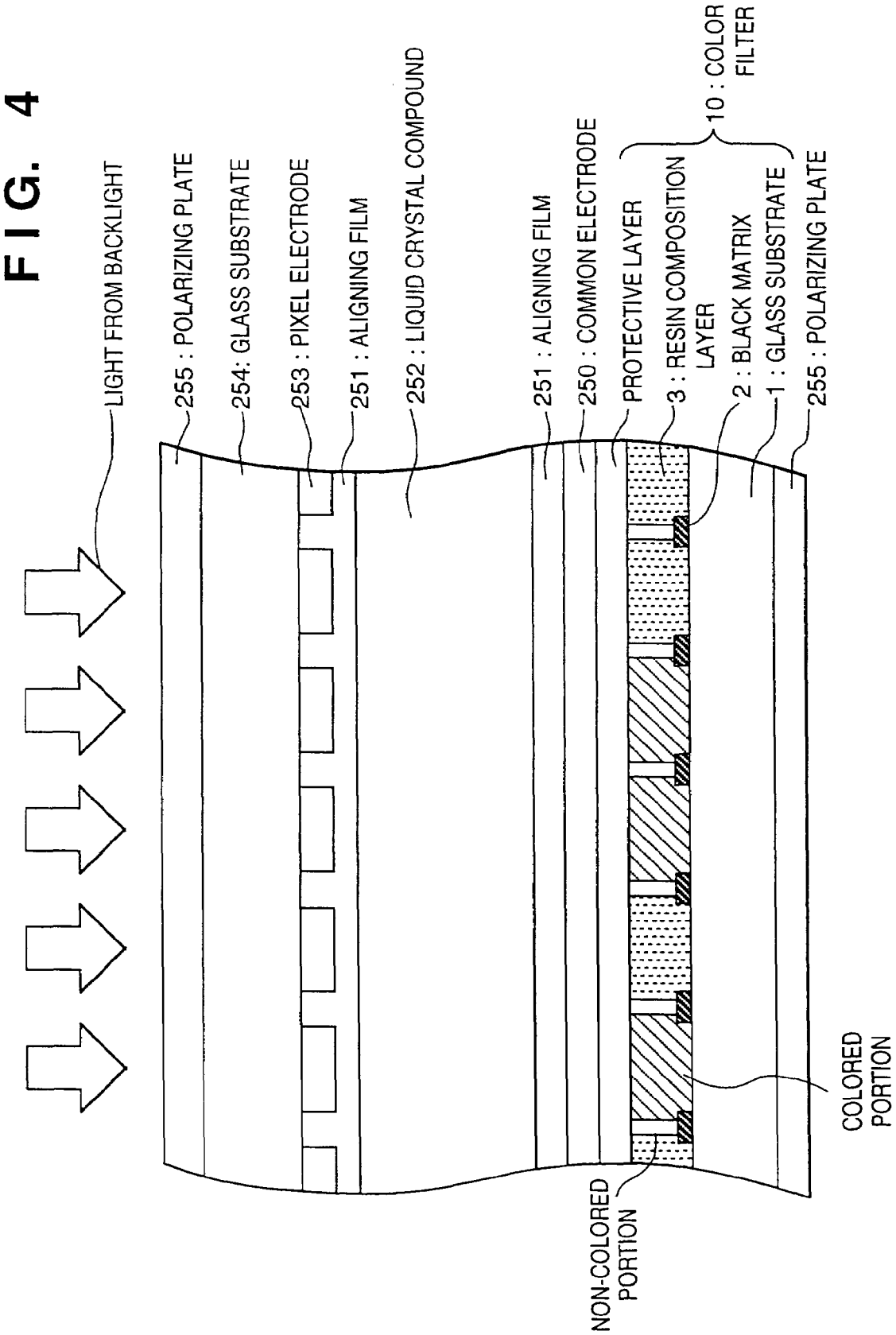

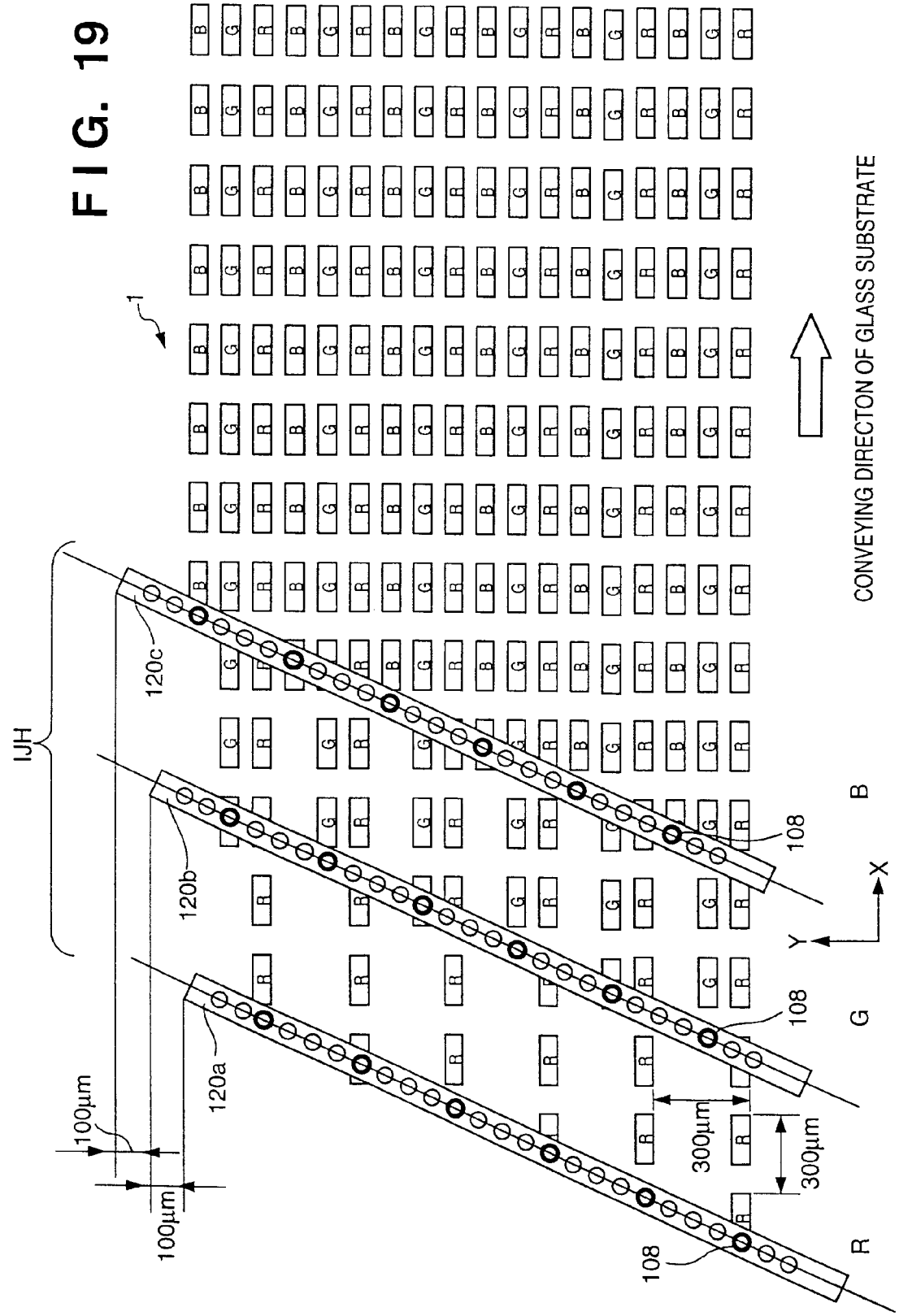

COLOR FILTER MANUFACTURING METHOD AND APPARATUS, INK-JET DEVICE, COLOR FILTER, DISPLAY DEVICE, AND APPARATUS HAVING DISPLAY DEVICE

This is a division of application Ser. No. 10/924,936, filed on Aug. 25, 2004 now U.S. Pat. No. 7,270,846, which is a divisional of application Ser. No. 08/679,979, filed on Jul. 15, 1996, which is now U.S. Pat. No. 6,874,883, issued on Apr. 5, 2005.

BACKGROUND OF THE INVENTION

1. Field of the Invention

The present invention relates to a color filter method and apparatus for manufacturing a color filter by forming a large number of pixels colored in a plurality of kinds of colors on a transparent substrate, an ink-jet device, a color filter, a display device, and an apparatus having the display device.

2. Description of the Related Art

With recent advances in personal computers, especially portable personal computers, the demand tends to arise for liquid crystal displays, especially color liquid crystal displays. However, in order to further popularize the use of liquid crystal displays, a reduction in cost must be achieved. Especially, it is required to reduce the cost of a color filter which occupies a large proportion of the total cost. Various methods have been tried to satisfy the required characteristics of color filters while meeting the above requirements. However, any method capable of satisfying all the requirements has not been established. The respective methods will be described below.

The first method is a dyeing method. In the dyeing method, a water-soluble polymer material as a dyeable material is applied to a glass substrate, and the coating is patterned into a desired shape by a photolithographic process. The obtained pattern is dipped in a dye bath to obtain a colored pattern. This process is repeated three times to form R, G, and B color filter layers.

The second method is a pigment dispersion method, which is currently replacing the dyeing method. In this method, a pigment-dispersed photosensitive resin layer is formed on a substrate and patterned into a single-color pattern. This process is repeated three times to obtain R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B coatings. Thereafter, the resin layers are thermoset to form colored layers.

The fourth method is a print method. In this method, a pigment is dispersed in a thermosetting resin, and a print operation is performed three times to form R, G, and B coatings separately, and thermosetting the resins, thereby forming colored layers. In either of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, this method cannot be applied to a TFT type color liquid display. In the print method, a pattern with a fine pitch cannot be formed because of poor resolution and poor evenness.

In order to eliminate these drawbacks, methods of manufacturing color filters by an ink-jet system are disclosed in Japanese Patent Laid-Open Nos. 59-75205, 63-235901, 63-294503, and 1-217320.

These references disclose, for example, a method of forming a color filter by an ink-jet method, in which a light-shielding film is formed on a transparent substrate to have opening portions with predetermined regularity, and an ink is discharged from an ink-jet head onto the opening portions to color the substrate.

In general, it takes much time and cost to develop an ink-jet head. Even if a custom ink-jet head is developed for a color filter manufacturing apparatus, since the production is smaller than that of ink-jet heads generally used for printers and the like, the cost of the custom ink-jet head is very high. As a result, the cost of the manufacturing apparatus becomes high, and hence the cost of a color filter increases.

Assume that ink-jet heads generally used for printers are applied to the manufacture of color filters. The resolution of most of the existing printer ink-jet heads is 300 dpi, 360 dpi, 400 dpi, 600 dpi, or 720 dpi. The pixel pitch of a color filter of a 9.4-inch VGA type is 300 μm (corresponding to 84.7 dpi). The pixel pitch of color filters of a 10.4-inch XGA type and a 12.9-inch EWS type is 207 μm (corresponding to 122.7 dpi). The pixel pitch of color filters of a 12.1-inch XGA type, a 13.8-inch EWS, and a 15.5-inch EWS type is 240 μm (corresponding to 105.8 dpi). There is no combination of an ink-jet head and a color filter whose resolution and pixel pitch match with each other or are an integral multiple. Considering other combinations, there is hardly any combination of an ink-jet head and a color filter whose resolution and pixel pitch match with each other or are an integral multiple.

When, therefore, an ink-jet head used for a general ink-jet printer is to be applied to a color filter manufacturing apparatus, the present applicant has studied a technique of matching the resolution of the ink-jet head with the pixel pitch of a color filter by positioning the ink-jet head obliquely with respect to a color filter substrate.

The present applicant has also studied a technique of mounting the ink-jet head on the manufacturing apparatus such that the angle of the ink-jet head can be changed with respect to the a color filter substrate to allow the single ink-jet head to cope with the pixel pitches of various types of color filters.

When, however, the ink-jet head is mounted obliquely with respect to a color filter, a coloring operation is performed by relatively scanning the ink-jet head and the color filter, a relative scanning operation is required in excess of an amount corresponding to the oblique positioning of the ink-jet head. This increases the coloring time required for one substrate. Especially when an ink-jet head shorter than the effective pixel area of a color filter is used, since a relative scanning operation must be performed a plurality of numbers of times, a longer coloring time is required. With an increase in coloring time per substrate, the production of color filters per unit time decreases, resulting in an increase in the cost of a color filter.

In addition, when an ink-jet head to be used is caused to stand, an ink in discharging nozzles of the ink-jet head increases its viscosity or solidifies upon contacting air. As a result, a discharge failure, i.e., inability to discharge the ink, or twisting, i.e., tilting of an ink discharging direction, may occur. For this reason, the nozzle surfaces are covered with cap members when the ink-jet head is not used. Even with the cap members, in an initial period of a discharging operation, first some inks to be discharged from one nozzle may not be discharged, or twisting may occur because of the influence of the ink whose viscosity has increased. If the ink is discharged onto a recording medium such as a paper sheet in this state, part of a character may be omitted or become excessively bright or dark, resulting in a deterioration in print quality. In order to prevent such a phenomenon, a receiving portion for receiving the pre-discharged ink is formed in a cap portion or the like, and several inks are preliminarily discharged (pre-discharging operation) onto the receiving portion before an actual printing operation is performed. This operation itself is generally performed in an ink-jet printer, and hence is not a special operation.

When an ink-jet head is applied to a color filter manufacturing apparatus, unlike in a general printer, a coloring operation is performed by discharging an ink from the ink-jet head onto opening portions having predetermined regularity, as described above. Owing to this method, the color filter manufacturing apparatus demands an ink landing accuracy 10 times higher than that in the general printer. For this reason, a pre-discharging operation becomes more important, and it is preferable that a pre-discharging operation always be performed before a color pattern is formed by discharging an ink onto a glass substrate.

When the manufacturing apparatus uses a long head which can color an entire glass substrate with one scanning operation after this pre-discharging operation, the following problem is not posed. When, however, the apparatus uses a short head which colors a glass substrate with a plurality of numbers of times of scanning operations, since the position of the head relative to the substrate is changed between the scanning operations, an idling time during which the discharging operation of the head is stopped is required. If this time increases, a discharge failure or twisting may occur in discharging the ink in the next scanning operation.

In coloring the entire substrate surface with a plurality of numbers of times of scanning operations, the same nozzles are not necessarily used for each scanning operation owing to the relationship between the number of discharging nozzles which can used in one scanning operation, and the number of pixels constituting a color filter. For this reason, nozzles which have not been used in the previous scanning operation may be used.

As is apparent, since the ink in the nozzles which have not been used in the previous scanning operation contact air without being used for a long period of time as compared with the ink in the remaining nozzles, the ink in the nozzles which have not been used may increase its viscosity or solidify. For this reason, when the ink is to be discharged from the nozzles which have not been used, a discharge failure, i.e., inability to discharge the ink, or twisting, i.e., tilting of an ink discharging direction, may occur. As a result, a defective color filter may be manufactured.

In order to prevent this, the head may be relatively moved to an ink-receiving portion for a pre-discharging operation, which is formed in the cap portion or the like to perform a pre-discharging operation every time a scanning operation is performed. With this operation, however, the time required to completely color one substrate increases, and the production per unit time decreases, resulting in an increase in the cost of a color filter. That is, the present applicant found this method undesirable.

In addition to the above problem, the following problem is also posed.

Prior to a detailed description of this problem, the following case studied by the present applicant will be described below with reference to FIG. 1. In applying an ink-jet head used for a general ink-jet printer to a color filter manufacturing apparatus, the ink-jet head is mounted obliquely with respect to a color filter substrate to match the resolution of the ink-jet head with the pixel pitch of a color filter.

FIG. 1 is a plan view showing how the pixels of a color filter are colored by an ink-jet head. With regard to the ink-jet head, only the position of a nozzle array is shown in FIG. 1. In this state, of a predetermined pattern, a portion to be colored in red is being colored. Note that the letters R, G, and B in the respective pixels in FIG. 1 indicate that the respective pixels are to be colored in red (R), green (G), and blue (B).

Reference numeral 1013 denotes a nozzle array formed on the ink-jet head. An ink is discharged from this nozzle array to form ink dots on the substrate. Reference numeral 1014 denotes each pixel of a color filter. On these pixels on the substrate, ink dots are formed.

In the case shown in FIG. 1, since the pixel pitch of the color filter does not coincide with the nozzle pitch of the ink-jet head, the head is tilted to make the positions of every three pixels of the same color in the Y direction coincide with the positions of the ink discharged from every five nozzles. Ink dots are then formed in the pixels 1014 while the ink-jet head is relatively moved in the X direction in FIG. 1, thereby coloring the pixels. This operation is performed using ink-jet heads for discharging red, green, and blue inks to manufacture a color filter. In this operation, in the ink-jet head for coloring red pixels, which is shown in FIG. 1, the second, seventh, and twelfth nozzles are used to discharge the ink, but the remaining nozzles are not used.

In this case, as this ink-jet head, a general ink-jet head having a nozzle pitch of 360 dpi (70.5 µm) is used. As the color filter, a filter having a pixel pitch of 100 µm is used.

This ink-jet head has the following characteristics:

(1) When a nozzle clogs with a solid matter in an ink, a normal discharging operation may not be performed. In this case, if a nozzle in use does not properly discharge an ink, the entire ink-jet head is replaced.

(2) In an ink-jet system using a thermal phenomenon, in particular, when a predetermined number of inks are discharged, the nozzle becomes incapable of properly discharging an ink because of scorching of the ink or the like. That is, the service life of each nozzle depends on the number of inks discharged. For this reason, an ink-jet head must be periodically replaced.

(3) In the ink-jet system using the thermal phenomenon, since a heater provided for each nozzle which is discharging an ink generates heat, repetition of a discharging operation will raise the temperature near the nozzle. The amount of ink discharged depends on temperatures. For this reason, ink dots gradually change in size, and the ink-jet head expands, resulting in deformation such as a change in nozzle pitch.

As described above, in a color filter manufacturing apparatus, if only specific nozzles are used, the following problems are posed:

(1) When a given nozzle becomes incapable of properly discharging an ink, the entire ink-jet head must be replaced, although the remaining nozzles can be used.

(2) In the ink-jet system using the thermal phenomenon, in particular, since the service life of each nozzle depends on the number of inks discharged, head replacement must be periodically performed. In this replacement, the overall service life of the ink-jet head coincides with the service life of some nozzles which have been used, although the majority of the remaining nozzles can be used.

(3) In the ink-jet system using the thermal phenomenon, in particular, as a discharging operation is performed, the temperature near each nozzle in use rises, and the amount of ink discharged varies. For this reason, the size and color density of ink dots formed on the substrate vary, adversely affecting the uniformity of a color filter.

The following problem is also posed. An impurity may elute from a coloring material contained in an ink used for a color filter into a liquid crystal layer to cause a deterioration in display quality. For this reason, this ink must be purified to remove such an impurity. Consequently, the ink becomes expensive. In order to achieve a reduction in cost, a demand has arisen for a reduction in the amount of ink used.

SUMMARY OF THE INVENTION

The present invention has been made in consideration of the above problems, and has as its object to provide a color filter manufacturing method and apparatus which can decrease the cost of an ink-jet head and the cost of the manufacturing apparatus by using an ink-jet head used in a general printer or having a simple structure as an ink-jet head used to manufacture a color filter.

It is another object of the present invention to provide an inexpensive color filter by reducing the amounts of inks used per color filter, a display device using the color filter, and an apparatus using the display device.

It is still another object of the present invention to provide a color filter manufacturing method and apparatus which can stabilize the discharging operation of an ink-jet head to suppress the occurrence of defective products and can shorten the drawing time required for one glass substrate and increase the production per unit time to produce a color filter at a lower cost when one glass substrate is to be colored by performing a scanning operation a plurality of numbers of times, a color filter, a display device, and an apparatus having the display device.

It is still another object of the present invention to provide a color filter manufacturing apparatus which can shorten the idle time between scanning operations during which each ink discharging nozzle of an ink-jet head having ink discharging nozzles arranged at a pitch equal to a pixel pitch discharges no ink, stabilize the discharging operation of the ink-jet head, suppress the occurrence of defective products, and increase the yield when a drawing operation is to be performed for one substrate by relatively scanning the ink-jet head a plurality of numbers of times.

It is still another object of the present invention to switch a currently used nozzle to another nozzle of the same ink-jet head.

It is still another object of the present invention to reduce the frequency at which ink-jet heads are replaced owing to the service life of each nozzle.

It is still another object of the present invention to keep the size and color density of each ink dot constant.

In order to solve the above problems and achieve the above objects, a color filter manufacturing apparatus of the present invention is characterized by the following arrangement according to its first aspect.

There is provided a manufacturing apparatus for a color filter manufactured by forming and arranging many pixels colored in the same color on a substrate in an X-axis direction as one direction, and periodically forming and arranging pixels such that pixels adjacent to each other in a Y-axis direction perpendicular to the X-axis direction are colored in different colors, comprising a plurality of ink-jet heads for different colors, each having a plurality of ink discharging nozzles arranged in the Y-axis direction, each ink-jet head having a first ink discharging nozzle group, in which a pitch of the plurality of ink discharging nozzles in the Y-axis direction is set to be equal to a pitch of the pixels of the same color in the Y-axis direction, and a second ink discharging nozzle group having a nozzle pitch set to be equal to the pixel pitch in the Y-axis direction like the first ink discharging nozzle group, moving means for moving the relative positions of the plurality of ink-jet heads and the substrate, and control means for controlling an operation of the moving means and ink discharging operations of the plurality of ink-jet heads, wherein when the first ink discharging nozzle group is used to color the pixels, the second ink discharging nozzle group is not used to color the pixels, and the control means controls an ink discharging operation of only a nozzle group, of the first and second ink discharging nozzles, which is to be used to color pixels of corresponding colors on the substrate.

A color filter manufacturing method of the present invention is characterized by the following process according to its first aspect.

There is provided a manufacturing method for a color filter manufactured by forming and arranging many pixels colored in the same color on a substrate in an X-axis direction as one direction, and periodically forming and arranging pixels such that pixels adjacent to each other in a Y-axis direction perpendicular to the X-axis direction are colored in different colors, comprising the steps of using a plurality of ink-jet heads for different colors, each having a plurality of ink discharging nozzles arranged in the Y-axis direction, each ink-jet head having a first ink discharging nozzle group, in which a pitch of the plurality of ink discharging nozzles in the Y-axis direction is set to be equal to a pitch of the pixels of the same color in the Y-axis direction, and a second ink discharging nozzle group having a nozzle pitch set to be equal to the pixel pitch in the Y-axis direction like the first ink discharging nozzle group, moving means for moving the relative positions of the plurality of ink-jet heads and the substrate, and control means for controlling an operation of the moving means and ink discharging operations of the plurality of ink-jet heads, the second ink discharging nozzle group for coloring of the pixels being not used when the first ink discharging nozzle group is used to color the pixels, and the control means controlling an ink discharging operation of only a nozzle group, of the first and second ink discharging nozzles, which is to be used to color pixels of corresponding colors on the transparent substrate, and causing each of the ink-jet heads to discharge an ink while scanning the ink-jet head in the X-axis direction, and coloring all the pixels by scanning the ink-jet head once or a plurality of numbers of times in the X-axis direction.

A color filter of the present invention is characterized by the following arrangement according to its first aspect.

There is provided a color filter manufactured by forming and arranging many pixels colored in the same color on a substrate in an X-axis direction as one direction, and forming and arranging pixels such that pixels adjacent to each other in a Y-axis direction perpendicular to the X-axis direction are colored in different colors, wherein the color filter is manufactured by using a plurality of ink-jet heads for different colors, each having a plurality of ink discharging nozzles arranged in the Y-axis direction, each ink-jet head having a first ink discharging nozzle group, in which a pitch of the plurality of ink discharging nozzles in the Y-axis direction is set to be equal to a pitch of the pixels of the same color in the Y-axis direction, and a second ink discharging nozzle group having a nozzle pitch set to be equal to the pixel pitch in the Y-axis direction like the first ink discharging nozzle group, moving means for moving the relative positions of the plurality of ink-jet heads and the substrate, and control means for controlling an operation of the moving means and ink discharging operations of the plurality of ink-jet heads, and causing each of the ink-jet heads to discharge an ink while scanning the ink-jet head in the X-axis direction, and coloring all the pixels by scanning the ink-jet head once or a plurality of numbers of times in the X-axis direction.

A display device of the present invention is characterized by the following arrangement according to its first aspect.

There is provided a display device using a color filter manufactured by forming and arranging many pixels colored in the same color on a substrate in an X-axis direction as one direction, and periodically forming and arranging pixels such that pixels adjacent to each other in a Y-axis direction perpendicular to the X-axis direction are colored in different colors, integrally comprising a color filter manufactured by using a plurality of ink-jet heads for different colors, each having a plurality of ink discharging nozzles arranged in the Y-axis direction, each ink-jet head having a first ink discharging nozzle group, in which a pitch of the plurality of ink discharging nozzles in the Y-axis direction is set to be equal to a pitch of the pixels of the same color in the Y-axis direction, and a second ink discharging nozzle group having a nozzle pitch set to be equal to the pixel pitch in the Y-axis direction like the first ink discharging nozzle group, moving means for moving the relative positions of the plurality of ink-jet heads and the substrate, and control means for controlling an operation of the moving means and ink discharging operations of the plurality of ink-jet heads, and causing each of the ink-jet heads to discharge an ink while scanning the ink-jet head in the X-axis direction, and coloring all the pixels by scanning the ink-jet head once or a plurality of numbers of times in the X-axis direction, and light amount changing means for changing a light amount.

An apparatus including a display device of the present invention is characterized by the following arrangement according to its first aspect.

There is provided an apparatus having a display device using a color filter manufactured by forming and arranging many pixels colored in the same color on a substrate in an X-axis direction as one direction, and periodically forming and arranging pixels such that pixels adjacent to each other in a Y-axis direction perpendicular to the X-axis direction are colored in different colors, integrally comprising a display device integrally having a color filter manufactured by using a plurality of ink-jet heads for different colors, each having a plurality of ink discharging nozzles arranged in the Y-axis direction, each ink-jet head having a first ink discharging nozzle group, in which a pitch of the plurality of ink discharging nozzles in the Y-axis direction is set to be equal to a pitch of the pixels of the same color in the Y-axis direction, and a second ink discharging nozzle group having a nozzle pitch set to be equal to the pixel pitch in the Y-axis direction like the first ink discharging nozzle group, moving means for moving the relative positions of the plurality of ink-jet heads and the substrate, and control means for controlling an operation of the moving means and ink discharging operations of the plurality of ink-jet heads, and causing each of the ink-jet heads to discharge an ink while scanning the ink-jet head in the X-axis direction, and coloring all the pixels by scanning the ink-jet head once or a plurality of numbers of times in the X-axis direction, and light amount changing means for changing a light amount, and image signal supply means for supplying an image signal to the display device.

An ink-jet apparatus of the present invention is characterized by the following arrangement.

There is provided an ink-jet apparatus for coloring a coloring medium by using a first ink discharging nozzle group, and a second ink discharging nozzle group capable of discharging an ink in place of the first ink discharging nozzle, comprising control means for causing only the first ink discharging nozzle group to perform a pre-discharging operation before the coloring medium is colored by the first ink discharging nozzle group, and causing both the first and second ink discharging nozzle groups to perform a pre-discharging operation at a frequency lower than that of a pre-discharging operation performed by the first ink discharging nozzle group.

A color filter manufacturing apparatus of the present invention is characterized by the following arrangement according to its second aspect.

There is provided a manufacturing apparatus for a color filter manufactured by forming and arranging a plurality of colored pixels on a substrate, comprising an ink-jet head having a plurality of ink discharging nozzles, moving means for moving relative positions of the ink-jet head and the substrate, and control means for controlling an operation of the moving means and an ink discharging operation of the ink-jet head, wherein when the ink-jet head is to be scanned a plurality of numbers of times so as to color the substrate, the control means controls an ink discharging operation such that ink discharging nozzles which have been used in a previous scanning operation are always used entirely or partly in a succeeding scanning operation.

A color filter manufacturing apparatus of the present invention is characterized by the following arrangement according to its third aspect.

There is provided a manufacturing apparatus for a color filter manufactured by forming and arranging a plurality of colored pixels on a substrate, comprising a plurality of ink-jet heads for different colors, each having a plurality of ink discharging nozzles, moving means for moving relative positions of the plurality of ink-jet heads and the substrate, and control means for controlling an operation of the moving means and ink discharging operations of the ink-jet head, wherein when the plurality of ink-jet heads are to be scanned a plurality of numbers of times so as to color an entire area of the substrate, the control means controls an ink discharging operation such that ink discharging nozzles which have been used in a previous scanning operation are always used entirely or partly in a succeeding scanning operation.

A color filter manufacturing apparatus of the present invention is characterized by the following arrangement according to its fourth aspect.

There is provided a manufacturing apparatus for a color filter manufactured by forming and arranging many pixels colored in the same color on a substrate in an X-axis direction as one direction, and periodically forming and arranging pixels such that pixels adjacent to each other in a Y-axis direction perpendicular to the X-axis direction are colored in different colors, comprising a plurality of ink-jet heads for different colors, each having a plurality of ink discharging nozzles arranged in the Y-axis direction, moving means for moving relative positions of the plurality of ink-jet heads and the substrate, and control means for controlling an operation of the moving means and ink discharging operations of the ink-jet head, wherein when the plurality of ink-jet heads are to be scanned a plurality of numbers of times so as to color an entire area of the substrate, the control means controls an ink discharging operation such that ink discharging nozzles which have been used in a previous scanning operation are always used entirely or partly in a succeeding scanning operation.

A color filter manufacturing apparatus of the present invention is characterized by the following arrangement according to its fifth aspect.

There is provided a manufacturing apparatus for a color filter manufactured by forming and arranging many pixels colored in the same color on a substrate in an X-axis direction as one direction, and forming and arranging pixels such that pixels adjacent to each other in a Y-axis direction perpendicular to the X-axis direction are colored in different colors, comprising a plurality of ink-jet heads for different colors, each having a plurality of ink discharging nozzles arranged in the Y-axis direction, the ink discharging nozzles being arranged at a pitch in the Y-axis direction which is equal to a pitch of pixels of the same color in the Y-axis direction, moving means for moving relative positions of the plurality of ink-jet heads and the substrate, and control means for controlling an operation of the moving means and ink discharging operations of the ink-jet head, wherein when the plurality of ink-jet heads are to be scanned a plurality of numbers of times so as to color an entire area of the substrate, the control means controls an ink discharging operation such that ink discharging nozzles which have been used in a previous scanning operation are always used entirely or partly in a succeeding scanning operation.

A color filter manufacturing method of the present invention is characterized by the following process according to its second aspect.

There is provided a method of manufacturing a color filter by arranging a plurality of colored pixels on a substrate by controlling relative positions of an ink-jet head having a plurality of ink discharging nozzles and the substrate, and discharging an ink from the ink-jet head onto the substrate, comprising in coloring an entire area of the substrate by scanning the ink-jet head a plurality of numbers of times, performing an ink discharging operation such that ink discharging nozzles which have been used in a previous scanning operation are always used entirely or partly in a succeeding scanning operation.

A color filter of the present invention is characterized by the following arrangement according to its second aspect.

There is provided a color filter manufactured by forming and arranging a plurality of colored pixels on a substrate, wherein the color filter is manufactured by using an ink-jet head having a plurality of ink discharging nozzles, moving means for moving relative positions of the ink-jet head and the substrate, and control means for controlling an operation of the moving means and an ink discharging operation of the ink-jet head, and performing an ink discharging operation such that ink discharging nozzles which have been used in a previous scanning operation are always used entirely or partly in a succeeding scanning operation, in coloring an entire area of the substrate by scanning the ink-jet head a plurality of numbers of times.

A display device of the present invention is characterized by the following arrangement according to its second aspect.

There is provided a display device using a color filter manufactured by forming and arranging a plurality of colored pixels on a substrate, integrally comprising a color filter is manufactured by using an ink-jet head having a plurality of ink discharging nozzles, moving means for moving relative positions of the ink-jet head and the substrate, and control means for controlling an operation of the moving means and an ink discharging operation of the ink-jet head, and performing an ink discharging operation such that ink discharging nozzles which have been used in a previous scanning operation are always used entirely or partly in a succeeding scanning operation, in coloring an entire area of the substrate by scanning the ink-jet head a plurality of numbers of times, and light amount changing means for changing a light amount.

An apparatus including a display device of the present invention is characterized by the following arrangement according to its second aspect.

There is provided an apparatus having a display device using a color filter manufactured by forming and arranging a plurality of colored pixels on a substrate, comprising a display device integrally having a color filter is manufactured by using an ink-jet head having a plurality of ink discharging nozzles, moving means for moving relative positions of the ink-jet head and the substrate, and control means for controlling an operation of the moving means and an ink discharging operation of the ink-jet head, and performing an ink discharging operation such that ink discharging nozzles which have been used in a previous scanning operation are always used entirely or partly in a succeeding scanning operation, in coloring an entire area of the substrate by scanning the ink-jet head a plurality of numbers of times, and light amount changing means for changing a light amount, and image signal output means for outputting an image signal to the display device.

A color filter manufacturing apparatus of the present invention is characterized by the following arrangement according to its sixth aspect.

There is provided a manufacturing apparatus for a color filter manufactured by forming and arranging many colored pixels on a substrate, comprising ink discharging means having a plurality of ink discharging nozzles, moving means for moving relative positions of the ink discharging means and the substrate, and control means for controlling an operation of the moving means and an ink discharging operation of the ink discharging means, wherein when the ink discharging means is to be scanned a plurality of numbers of times to color the substrate, the control means controls such that the numbers of nozzles used for coloring in the respective scanning operations become substantially equal to each other.

A color filter manufacturing apparatus of the present invention is characterized by the following arrangement according to its seventh aspect.

There is provided a manufacturing apparatus for a color filter manufactured by forming and arranging many colored pixels on a substrate, comprising a plurality of ink discharging means for different colors, each having a plurality of ink discharging nozzles, moving means for moving relative positions of the plurality of ink discharging means and the substrate, and control means for controlling an operation of the moving means and ink discharging operations of the plurality of ink discharging means, wherein when the plurality of ink discharging means are to be scanned a plurality of numbers of times to color an entire area of the substrate, the control means controls such that the numbers of nozzles used for coloring in the respective scanning operations become substantially equal to each other.

A color filter manufacturing apparatus of the present invention is characterized by the following arrangement according to its eight aspect.

There is provided a manufacturing apparatus for a color filter manufactured by forming and arranging many pixels colored in the same color on a substrate in an X-axis direction as one direction, and forming and arranging pixels such that pixels adjacent to each other in a Y-axis direction perpendicular to the X-axis direction are colored in different colors, comprising a plurality of ink discharging means for different colors, each having a plurality of ink discharging nozzles arranged in the Y-axis direction, moving means for moving relative positions of the plurality of ink discharging means and the substrate, and control means for controlling an operation of the moving means and ink discharging operations of the plurality of ink discharging means, wherein when the plurality of ink discharging means are to be scanned a plurality of numbers of times to color an entire area of the substrate, the control means controls such that the numbers of nozzles used for coloring in the respective scanning operations become substantially equal to each other.

A color filter manufacturing apparatus of the present invention is characterized by the following arrangement according to its ninth aspect.

There is provided a manufacturing apparatus for a color filter manufactured by forming and arranging many pixels colored in the same color on a substrate in an X-axis direction as one direction, and forming and arranging pixels such that pixels adjacent to each other in a Y-axis direction perpendicular to the X-axis direction are colored in different colors, comprising a plurality of ink discharging means for different colors, each having a plurality of ink discharging nozzles arranged in the Y-axis direction, the ink discharging means having nozzle arrays in which at least a pitch of the plurality of ink discharging nozzles in the Y-axis direction is set to be equal to a pitch of pixels of the same color in the Y-axis direction, moving means for moving relative positions of the plurality of ink discharging means and the substrate, and control means for controlling an operation of the moving means and ink discharging operations of the plurality of ink discharging means, wherein when the plurality of ink discharging means are to be scanned a plurality of numbers of times to color an entire area of the substrate, the control means controls such that the numbers of nozzles used for coloring in the respective scanning operations become substantially equal to each other.

A color filter manufacturing method of the present invention is characterized by the following process according to its third aspect.

There is provided a manufacturing method for a color filter manufactured by forming and arranging many colored pixels on a substrate, comprising in coloring an entire area of the substrate by performing a scanning operation of moving relative positions of an ink discharging means having a plurality of ink discharging nozzles and the substrate a plurality of numbers of times, performing a coloring operation such that the numbers of nozzles used for coloring in the respective scanning operations become substantially equal to each other.

A color filter of the present invention is characterized by the following arrangement according to its third aspect.

There is provided a color filter manufactured by forming and arranging many colored pixels on a substrate, wherein when an entire area of the substrate is to be colored by performing a scanning operation of moving relative positions of an ink discharging means having a plurality of ink discharging nozzles and the substrate a plurality of numbers of times, a coloring operation is performed such that the numbers of nozzles used for coloring in the respective scanning operations become substantially equal to each other.

A display device of the present invention is characterized by the following arrangement according to its third aspect.

There is provided a display device using a color filter manufactured by forming and arranging many colored pixels on a substrate, integrally comprising a color filter manufactured by performing a coloring operation such that the numbers of nozzles used for coloring in the respective scanning operations become substantially equal to each other when an entire area of the substrate is to be colored by performing a scanning operation of moving relative positions of an ink discharging means having a plurality of ink discharging nozzles and the substrate a plurality of numbers of times, and light amount changing means for changing a light amount.

An apparatus including a display device of the present invention is characterized by the following arrangement according to its third aspect.

There is provided an apparatus having a display device using a color filter manufactured by forming and arranging many colored pixels on a substrate, comprising a display device integrally having a color filter manufactured by performing a coloring operation such that the numbers of nozzles used for coloring in the respective scanning operations become substantially equal to each other when an entire area of the substrate is to be colored by performing a scanning operation of moving relative positions of an ink discharging means having a plurality of ink discharging nozzles and the substrate a plurality of numbers of times, and light amount changing means for changing a light amount, and image signal output means for outputting an image signal to the display device.

A color filter manufacturing method of the present invention is characterized by the following process according to its fourth aspect.

There is provided a color filter manufacturing method of dividing all ink discharging nozzles of an ink-jet head having the plurality of ink discharging nozzles into a plurality of nozzle groups each including a predetermined number of nozzles, discharging an ink upon switching the plurality of nozzle groups as needed, and coloring each pixel of a color filter, comprising the switching step of switching the plurality of nozzle groups, and the compensation step of compensating for a positional offset between a nozzle group to be used and each pixel.

A color filter manufacturing apparatus of the present invention is characterized by the following arrangement according to its tenth aspect.

There is provided a color filter manufacturing apparatus for dividing all ink discharging nozzles of an ink-jet head having the plurality of ink discharging nozzles into a plurality of nozzle groups each including a predetermined number of nozzles, discharging an ink upon switching the plurality of nozzle groups as needed, and coloring each pixel of a color filter, comprising switching means for switching the plurality of nozzle groups, control means for controlling a switching operation of the switching means, and compensation means for, when the nozzle groups are switched by the switching means, compensating for a positional offset between the nozzle group to be used and each pixel.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1 is a view showing the relationship between a color filter and an ink-jet head in a color manufacturing apparatus;

FIGS. 2A to 2F are sectional views for explaining a color filter manufacturing process;

FIG. 4 is a sectional view showing the structure of a TFT liquid crystal panel incorporating a color filter manufactured by a manufacturing apparatus of an embodiment of the present invention;

FIG. 19 is a view showing the positional relationship between each pixel and each discharging nozzle in the manufacturing apparatus of the embodiment;

DETAILED DESCRIPTION OF THE PREFERRED EMBODIMENTS

Figure 3A:
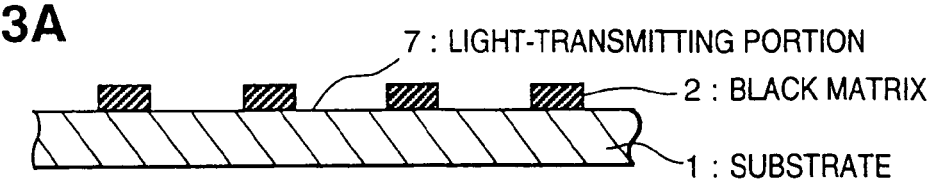
FIGS. 3A to 3F are sectional views for explaining another color filter manufacturing process.

The preferred embodiments of the present invention will be described in detail below with reference to the accompanying drawings.

First Embodiment

FIGS. 2A to 2F show a color filter manufacturing process using a color filter manufacturing apparatus according to an embodiment of the present invention.

In this embodiment, as a substrate 1, a glass substrate is generally used. However, a substrate other than a glass substrate can be used as long as it has characteristics required for a liquid crystal color filter, e.g., good transparency and high mechanical strength.

First of all, the glass substrate 1 is prepared, on which a black matrix 2 is formed to clearly partition off each pixel of a color filter so as to obtain a clear image (FIG. 2A). As a method of forming a black matrix, a method of forming a thin metal film on a substrate by sputtering or deposition, and patterning the film by a photolithographic process is available.

As shown in FIG. 2B, a coating material is applied to the substrate 1, on which the black matrix 2 is formed. The resultant structure is pre-baked, as needed, to form a resin composition layer 3. Upon irradiation of light or irradiation of light and a heat treatment, the ink absorption property of the irradiated portions of the resin composition layer 3 improves. As the coating material, the following resin composition is used. Upon exposure or exposure and a heat treatment, the ink absorption property of the exposed portions of the resin composition improves. By using the difference in ink absorption property between the exposed and non-exposed portions, color mixing of inks and the unnecessary diffusion of an ink can be prevented.

Pattern exposure is performed, via a mask 4, with respect to the coating material on the portions which are not light-shielded by the black matrix 2 to perform an ink affinity process (FIG. 2C), thereby forming a latent image (FIG. 2D).

Subsequently, ink-jet heads are used to discharge R (red), G (green), and B (blue) inks onto portions 6 having affinities for inks (FIG. 2E), and the inks are dried, as needed.

Irradiation of light or a heat treatment and irradiation of light are performed to cure the colored coating material, and a protective layer 8 is formed as needed (FIG. 2F). The protective layer 8 can be made of, e.g., a resin material of a photo-setting type, thermosetting type, or photo-setting/thermosetting type, or an inorganic film formed by deposition or sputtering. The resultant layer needs to have transparency upon formation of a color filter and be sufficiently resistant to the subsequent processes such as an ITO (Indium Tin Oxide) formation process and an aligning film formation process.

FIGS. 3A to 3F are views showing another color filter manufacturing process.

Figure 3B:
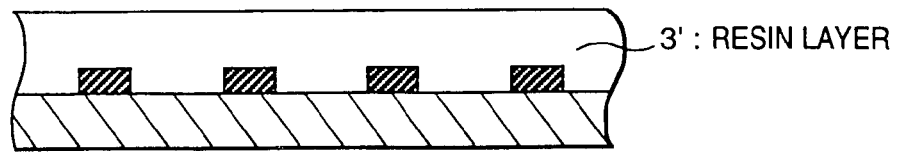

FIG. 3A shows a glass substrate 1 having a black matrix 2 constituted by light-transmitting portions 7 and light-shielding portions. First of all, the glass substrate 1, on which the black matrix 2 is formed, is coated with a resin composition which can be cured upon irradiation of light or irradiation of light and heating, and exhibits ink receptivity. The resultant structure is pre-baked, as needed, to form a resin composition layer 3' (FIG. 3B). The resin composition layer 3' can be formed by a coating method such as spin coating, roller coating, bar coating, spraying, or dipping. However, a coating method to be used is not specifically limited.

Figure 3C:
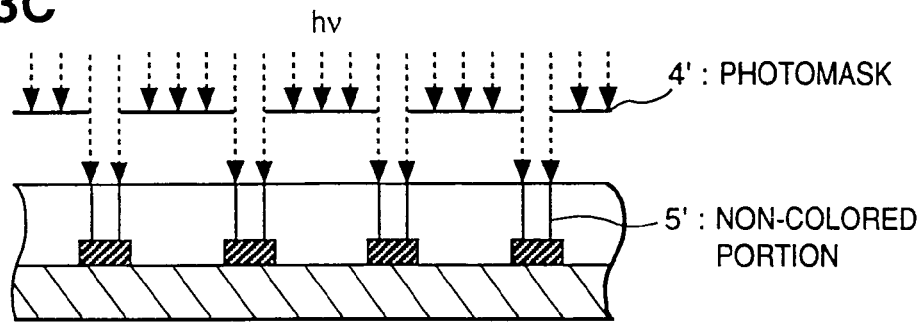
Figure 3D:
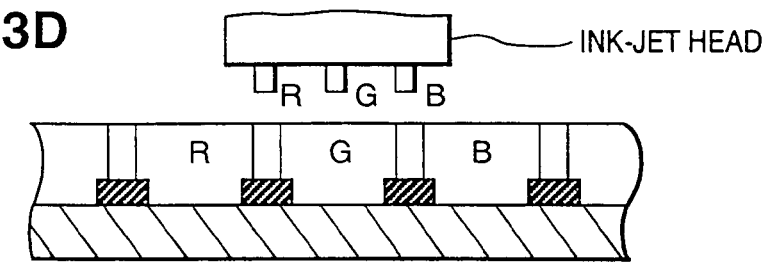
Figure 3E:
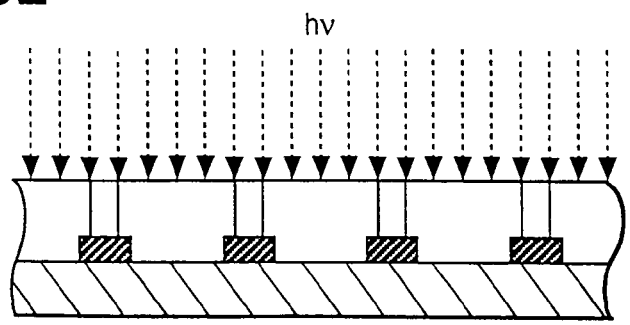

Subsequently, pattern exposure is performed by using a photomask 4' with respect to the resin layer portions which are light-shielded by the black matrix 2 to partly cure the resin layer, thereby forming portions 5' (non-colored portions) which do not absorb an ink (FIG. 3C). Thereafter, the resin layer is colored in R, G, and B at once by using the ink-jet heads (FIG. 3D), and the inks are dried, as needed.

As the photomask 4' used when pattern exposure is performed, a mask having opening portions for curing the portions light-shielded by the black matrix is used. In this case, in order to prevent a color omission of the color material at a portion in contact with the black matrix, a relatively large amount of ink must be discharged. For this reason, a mask having opening portions each having a size smaller than the width of each light-shielding portion of the black matrix.

As an ink to be used for a coloring operation, either of dye and pigment inks can be used, and either of liquid and solid inks can be used.

As a curable resin composition to be used in the present invention, any resin composition which has ink receptivity and can be cured by at least one of the following treatments: irradiation of light and a combination of irradiation of light and heating, can be used. As resins, acrylic resin, epoxy resin, and silicone resin are available. As cellulose derivatives, hydroxypropyl cellulose, hydroxy ethyl cellulose, methyl cellulose, carboxymethyl cellulose are available, and modified materials are available.

Optical initiators (crosslinkers) can also be used to make crosslinking reactions of these resins proceed upon irradiation of light or irradiation of light and heat. As optical initiators, dichromate, a bis-azide compound, a radical-based initiator, a cation-based initiator, an anion-based initiator, and the like can be used. Mixtures of these optical initiators and combinations of the initiators and sensitizers can also be used. In addition, an optical acid generating agent such as onium salt can be used as a crosslinker. In order to make a crosslinking reaction further proceed, a heat treatment may be performed after irradiation of light.

Resin layers containing these compositions have excellent heat resistance, excellent water resistance, and the like, and are sufficiently resistant to high temperatures and cleaning in the subsequent steps.

As an ink-jet system used in the present invention, a bubble-jet type using an electrothermal converter as an energy generating element, a piezoelectric jet type using a piezoelectric element, or the like can be used. A coloring area and coloring pattern can be arbitrarily set.

This embodiment exemplifies the structure in which the black matrix is formed on the substrate. However, after a curable resin composition layer is formed or after coloring is performed, a black matrix may be formed on the resin layer without posing any problem. That is, the form of a black matrix is not limited to that in this embodiment. As a method of forming a black matrix, a method of forming a thin metal film on a substrate by sputtering or deposition, and patterning the film by a photolithographic process is preferably used. However, the present invention is not limited to this.

Figure 3F:
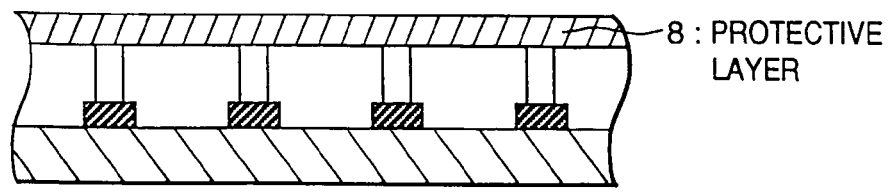

Subsequently, the curable resin composition is cured by performing only one of the following treatments: irradiation of light, a heat treatment, and a combination of irradiation of light and a heat treatment (FIG. 3E), and a protective layer 8 is formed, as needed (FIG. 3F). Note that reference symbol hv denotes the intensity of light. When a heat treatment is to be performed, heat is applied instead of hv. The protective layer 8 can be made of a second resin composition of a photo-setting type, thermosetting type, or photo-setting/thermosetting type. The resultant layer needs to have transparency upon formation of a color filter and be sufficiently resistant to the subsequent processes such as an ITO formation process and an aligning film formation process.

Figure 5:
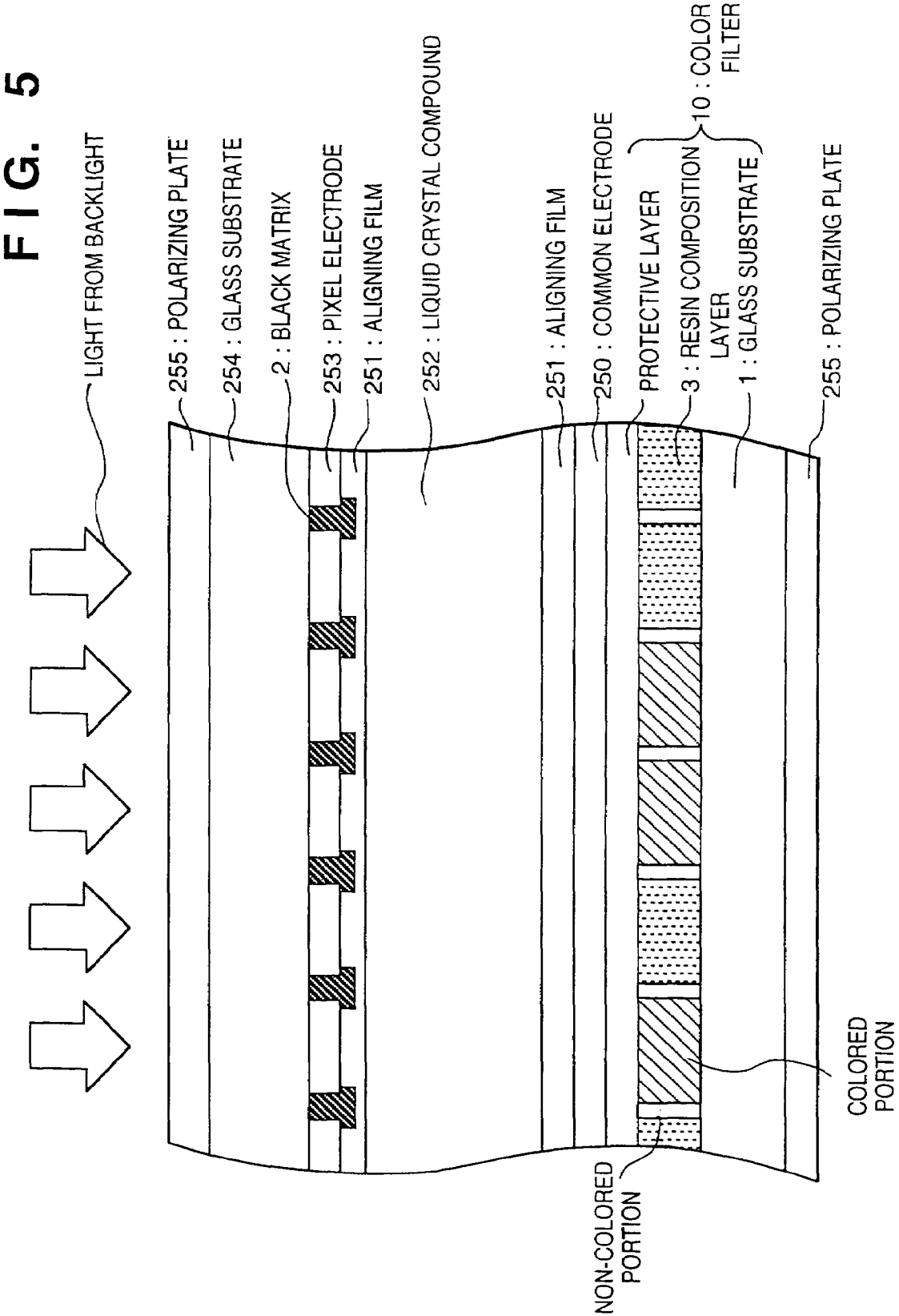
FIG. 5 is a sectional view showing the structure of a TFT liquid crystal panel incorporating a color filter manufactured by the manufacturing apparatus of an embodiment of the present invention.

FIGS. 4 and 5 are sectional views each showing a TFT (Thin Film Transistor) color liquid crystal panel incorporating the color filter of this embodiment. Note that the form of a color liquid crystal panel is not limited to any of these examples.

In general, a color liquid crystal panel is formed by joining a color filter substrate 1 to a counter substrate 254 and sealing a liquid crystal compound 252 therebetween. TFTs (Thin Film Transistors) (not shown) and transparent pixel electrodes 253 are formed on the inner surface of one substrate 254 of the liquid crystal panel in a matrix form. A color filter 10 is placed on the inner surface of the other substrate 12 such that the R, G, and B coloring materials are positioned to oppose the pixel electrodes. A transparent counter electrode (common electrode) 250 is formed on the entire surface of the color filter 10. A black matrix 2 is generally formed on the color filter substrate 1 side (see FIG. 4). However, in a BM (Black Matrix) on-array type liquid crystal panel, the black matrix is formed on the TFT substrate side opposing the color filter substrate (see FIG. 5). In addition, aligning films 251 are formed within the planes of the two substrates. By performing a rubbing process for the aligning films 251, the liquid crystal molecules can be aligned in a predetermined direction. Polarizing plates 255 are bonded to the outer surface of the respective glass substrates. The liquid crystal compound 252 is filled in the gap (about 2 to 5 µm) between these glass substrates. As a blacklight, a combination of a fluorescent lamp (not shown) and a scattering plate (not shown) is generally used. A display operation is performed by causing the liquid crystal compound to serve as an optical shutter for changing the transmittance for light emitted from the backlight.

A case wherein the above liquid crystal display device is applied to an information processing apparatus will be described below with reference to FIGS. 6 to 8.

Figure 6:
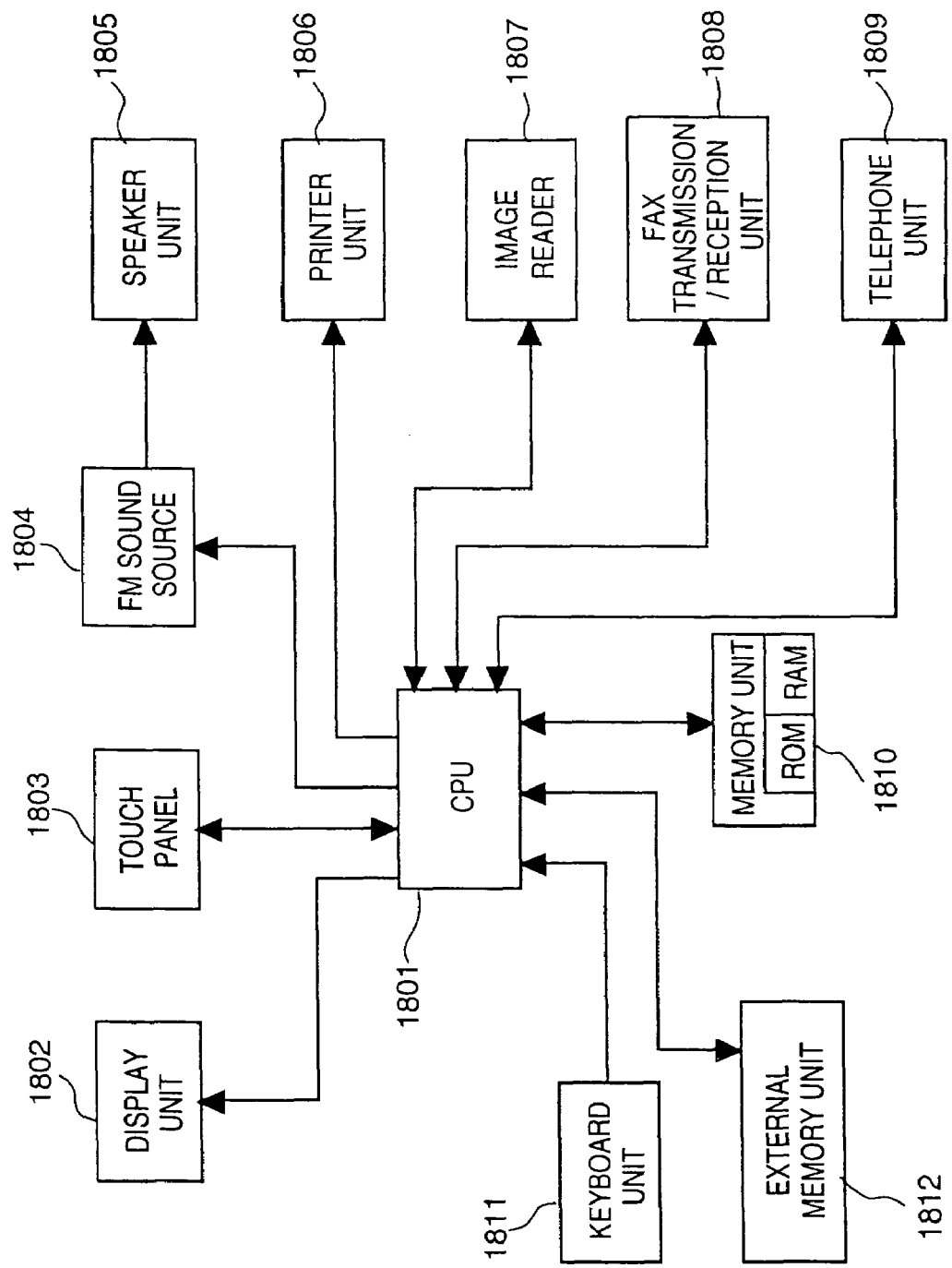
FIG. 6 is a block diagram showing an information processing apparatus using a liquid crystal panel.

FIG. 6 is a block diagram showing the schematic arrangement of an information processing apparatus serving as a wordprocessor, a personal computer, a facsimile apparatus, and a copying machine, to which the above liquid crystal display device is applied.

Referring to FIG. 6, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for the wordprocessor, the personal computer, the facsimile apparatus, and the copying machine.

Reference numeral 1807 denotes an image reader unit for photoelectrically reading original data. The image reader unit 1807 is arranged midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 7:
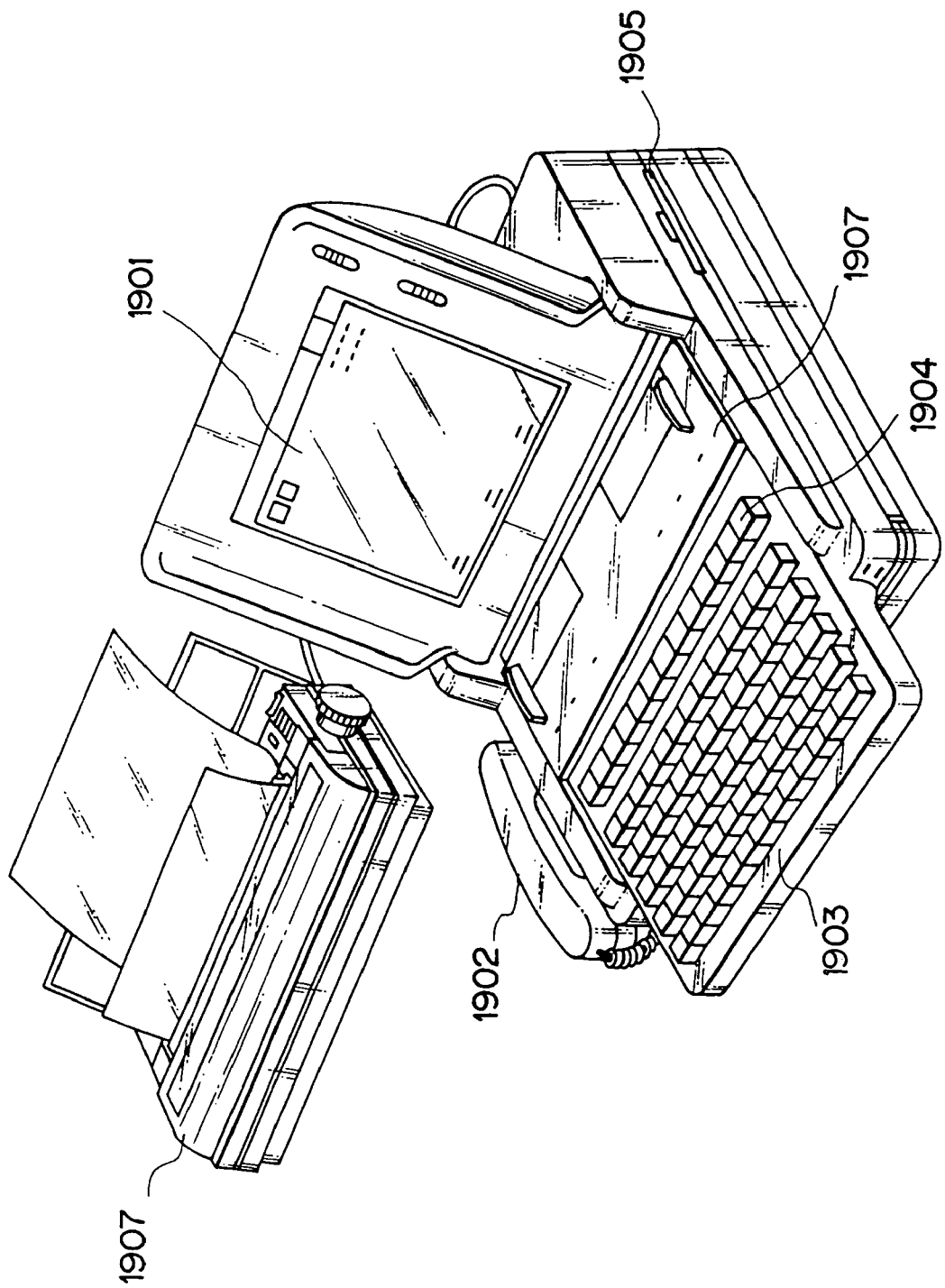
FIG. 7 is a perspective view showing the information processing apparatus using the liquid crystal panel.

FIG. 7 is a perspective view of the information processing apparatus in FIG. 6.

Referring to FIG. 7, reference numeral 1901 denotes a flat panel display using the above liquid crystal display device, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation or the like, received data is printed out by an ink-jet printer 1907.

When the above information processing apparatus is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus is to serve as the receiver of the facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus is to serve as the copying machine, an original is read by the image reader unit 1807, and the read original data is output, as an image to be copied, to the printer unit 1806 via the control unit 1801. Note that when the information processing apparatus is to serve as the receiver of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 8:
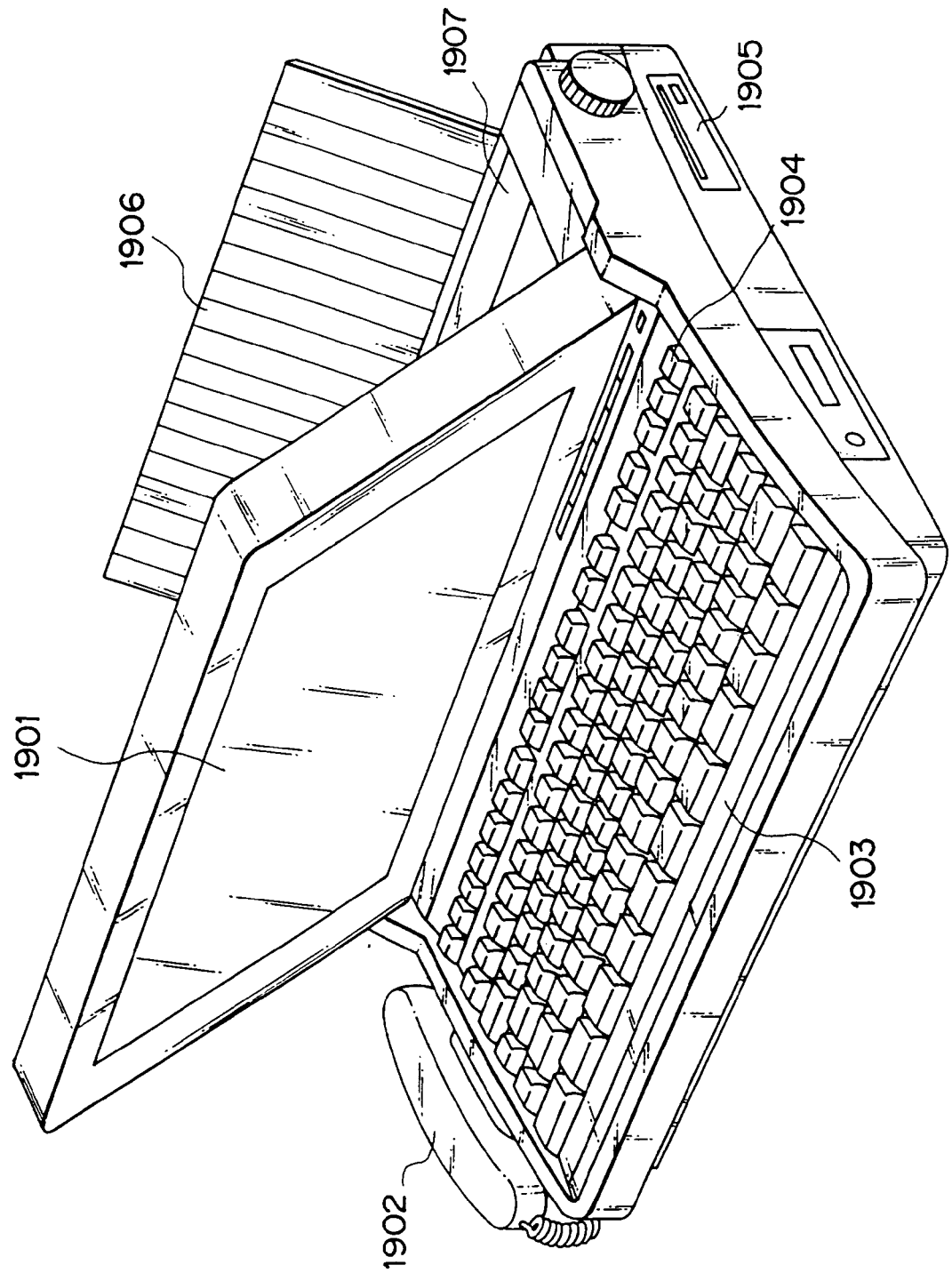
FIG. 8 is a perspective view showing an information processing apparatus using a liquid crystal panel.

Note that the above information processing apparatus may be designed as an integrated apparatus incorporating an ink-jet printer in the main body, as shown in FIG. 8. In this case, the portability of the apparatus can be improved. The same reference numerals in FIG. 8 denote parts having the same functions as those in FIG. 7.

Figure 9:
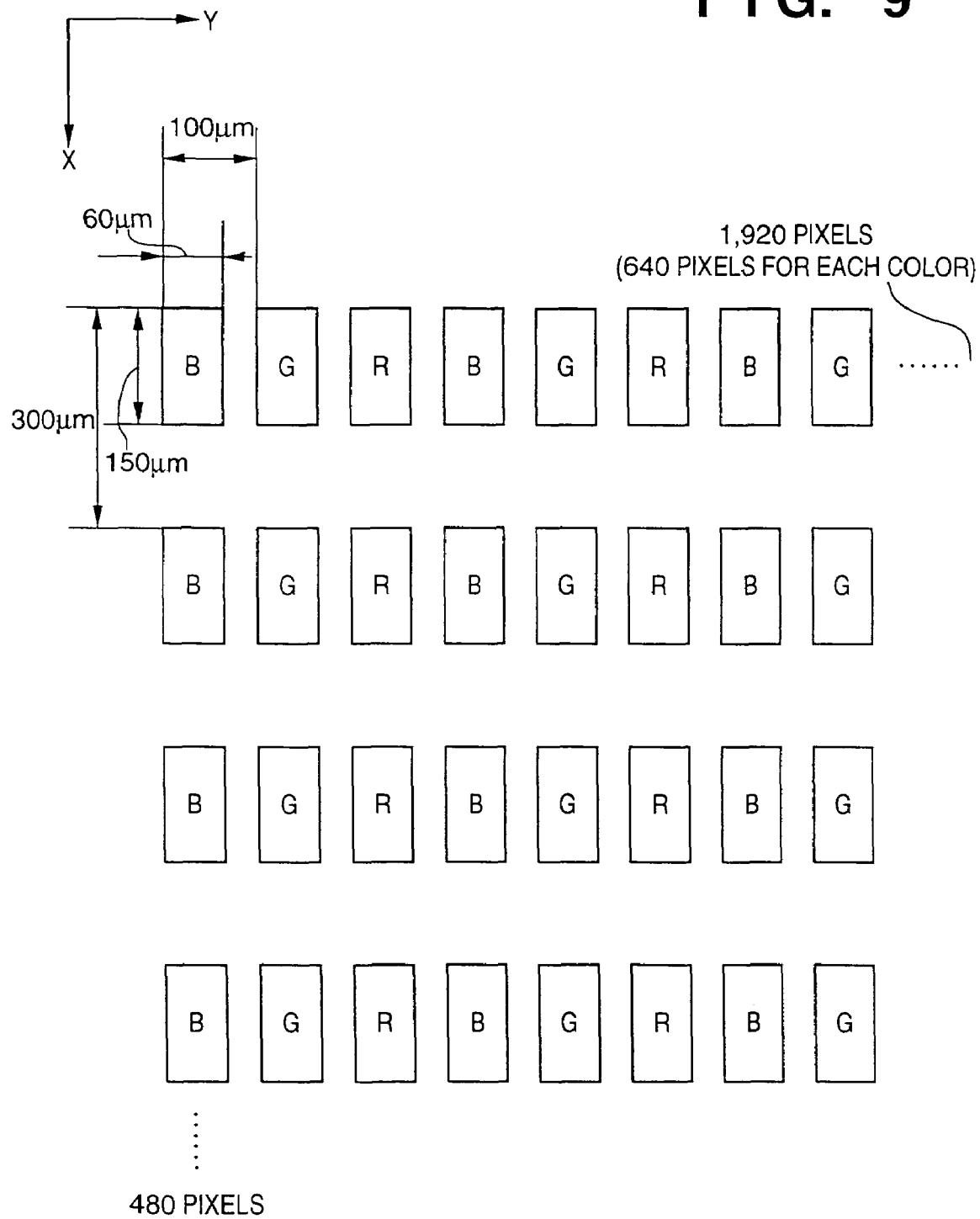
FIG. 9 is a view showing the pattern of a color filter manufactured by the manufacturing apparatus of the embodiment.

FIG. 9 shows the color pattern of a color filter manufactured by the color filter manufacturing apparatus of this embodiment. Each of the portions colored by R, G, and B inks is a pixel, which has an almost rectangular shape. Assume that the longitudinal direction of one pixel is the X direction, and a direction perpendicular to the X direction is the Y direction. All the pixels have the same size, i.e., 150 µm×60 µm. The pitch in the X direction is 300 µm, and the pitch in the Y direction is 100 g m. Pixels of the same color are arranged in a row in the X direction, and pixels are arranged in the Y direction such that adjacent pixels have different colors. The pattern shown in FIG. 9 corresponds to the pattern of the black matrix formed in the step shown in FIG. 2A.

Figure 10:
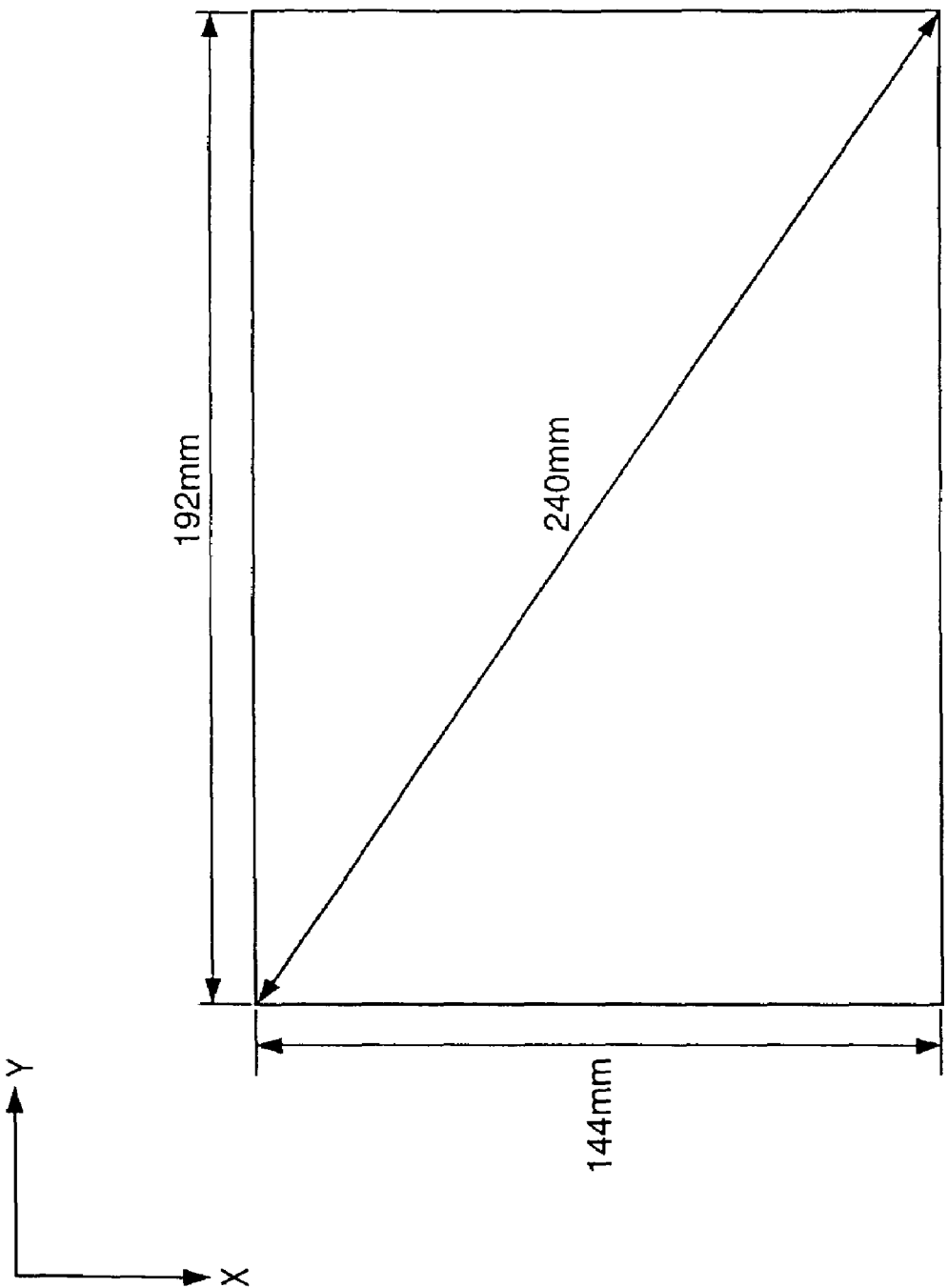
FIG. 10 is a view showing the size of the display unit of a TFT liquid crystal panel incorporating a color filter manufactured by the manufacturing apparatus of the embodiment.

The number of pixels in the X direction is 480, and that in the Y direction is 1,920 (640 pixels of each color). As shown in FIG. 10, the screen of the color filter has a size of 144 mm×192 mm, which corresponds to a 9.4-inch liquid crystal panel having a diagonal length of 240 mm.

Figure 11:
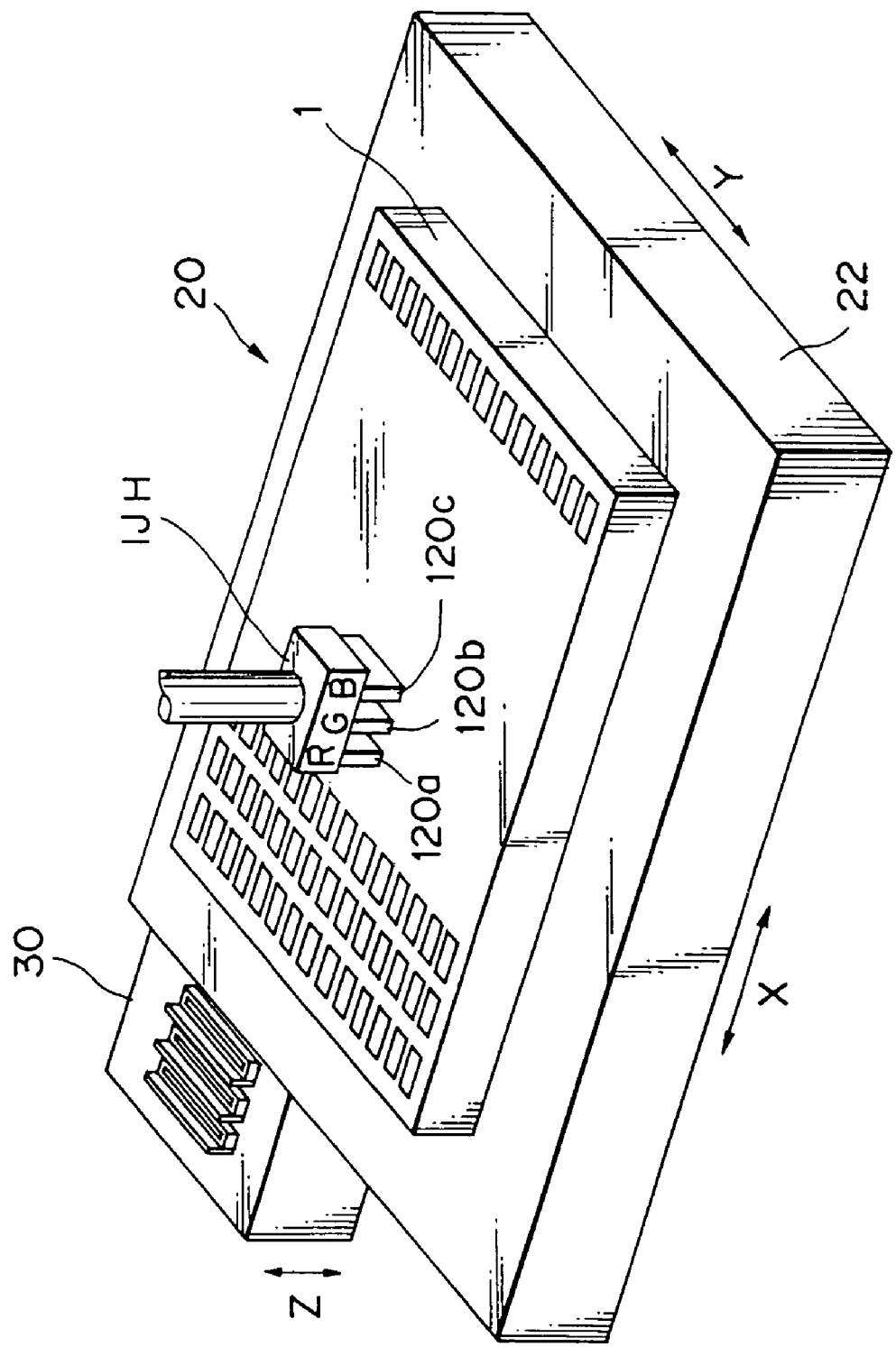
FIG. 11 is a perspective view showing the structure of an ink-jet head.

FIG. 11 shows the arrangement of a manufacturing apparatus for manufacturing the color filter in FIG. 9.

Referring to FIG. 11, a manufacturing apparatus 20 comprises an X-Y table 22 mounted on a base (not shown) and capable of moving in the X and Y directions in FIG. 11, and an ink-jet head IJH fixed on the base via a support member (not shown) above the X-Y table 22. A glass substrate 1 on which a black matrix 2 and a resin composition layer 3 are formed in advance by the above method is placed on the X-Y table 22. The ink-jet head IJH includes a red head 120*a* for discharging a red ink, a green head 120*b* for discharging a green ink, and a blue head 120*c* for discharging a blue ink. These heads 120*a*, 120*b*, and 120*c* are designed to discharge inks independently.

A restoring unit 30 for performing a restoring operation for the ink-jet head IJH is provided on an end portion of the X-Y table 22 to be movable in the Z direction with respect to the X-Y table 22.

Figure 12:
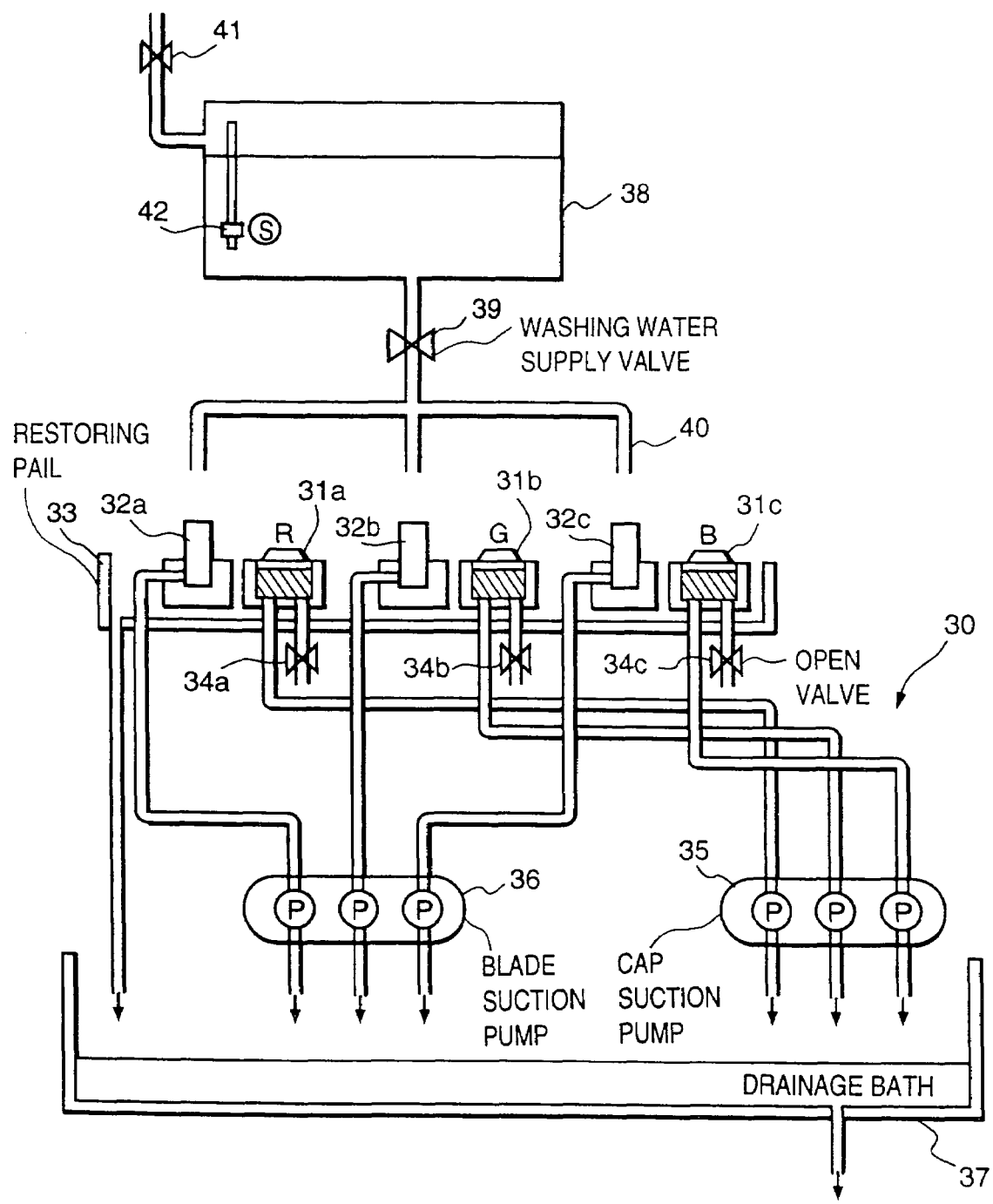
FIG. 12 is a view showing the arrangement of a restoring unit for the manufacturing apparatus of the embodiment.
Figure 13:
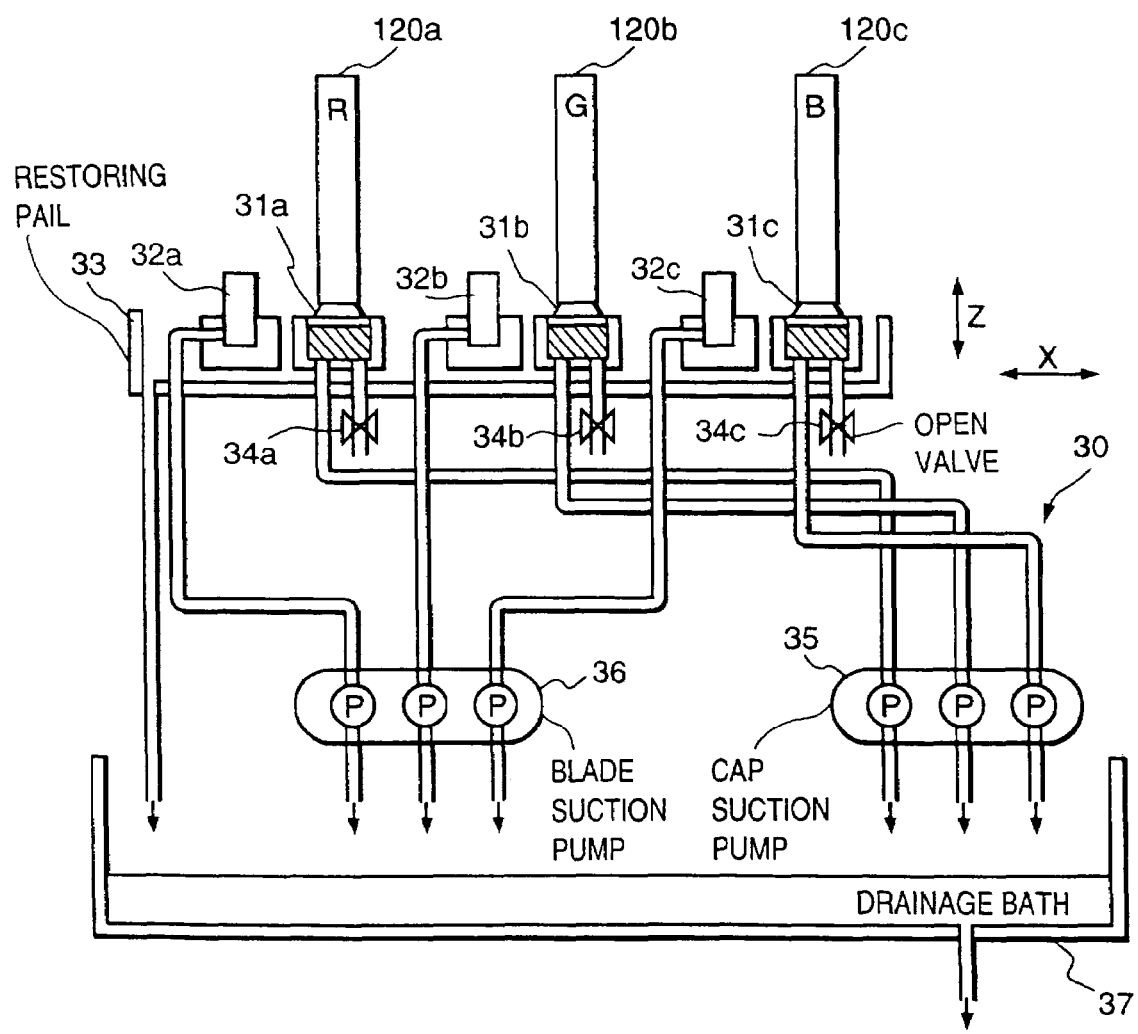
FIG. 13 is a view showing a state wherein the restoring unit for the manufacturing apparatus of the embodiment is performing a capping operation.

The restoring unit 30 has a function of preventing clogging of each nozzle of the ink-jet head IJH and removing an ink or dust adhering to each nozzle surface of the ink-jet head IJH to always allow a proper ink discharging operation, and a function of preventing the manufacture of a defective product by preventing dust adhering to each nozzle surface from falling onto a glass substrate during a coloring operation. FIG. 12 shows the arrangement of the restoring unit 30.

Reference numerals 31a, 31b, and 31c denote caps corresponding to the red, green, and blue heads 120a, 120b, and 120c of the ink-jet head IJH. While the ink-jet heads 120a, 120b, and 120c are not performing color filter coloring operations with respect to the glass substrate 1, the caps 31a, 31b, and 31c respectively cover the nozzle surfaces of the ink-jet heads 120a, 120b, and 120c to prevent the heads from being incapable of discharging the inks. Assume that the discharging operations of the ink-jet heads 120a, 120b, and 120c are resumed after a predetermined idle time. In this case, even if the above caps 31a, 31b, and 31c are used, owing to the influence of an increase in the viscosity of each ink, a discharge failure or twisting may occur in discharging first some inks. That is, first some inks to be discharged from one nozzle may not be discharged or may curve through the air. In this case, after not less than a predetermined amount of ink is discharged, a normal state is restored, and the ink is discharged straight. If such a failure occurs while the glass substrate 1 is colored, some pixels cannot be colored, or the ink does not land at correct positions, resulting in a defective product. In order to prevent such a phenomenon, a predetermined amount of ink is discharged from each head, i.e., a pre-discharging operation is performed, before the glass substrate 1 is colored.

In this embodiment, this pre-discharging operation is performed by using the caps. However, dedicated ink-receiving portions for pre-discharging may be formed in other portions.

The caps 31a, 31b, and 31c also have a function of capping the ink-jet heads 120a, 120b, and 120c and receiving inks from the respective nozzles so as to prevent the nozzles from discharging excessive amounts of inks when an operation (pressuring/restoring operation) of keeping the ink-jet heads 120a, 120b, and 120c in a normal state is to be performed by periodically pressuring or circulating inks from the ink supply side to the ink-jet heads 120a, 120b, and 120c using an ink pressuring motor (not shown) and forcibly discharging bubbles and dust, which cause discharge failures, from the nozzles.

Figure 14:
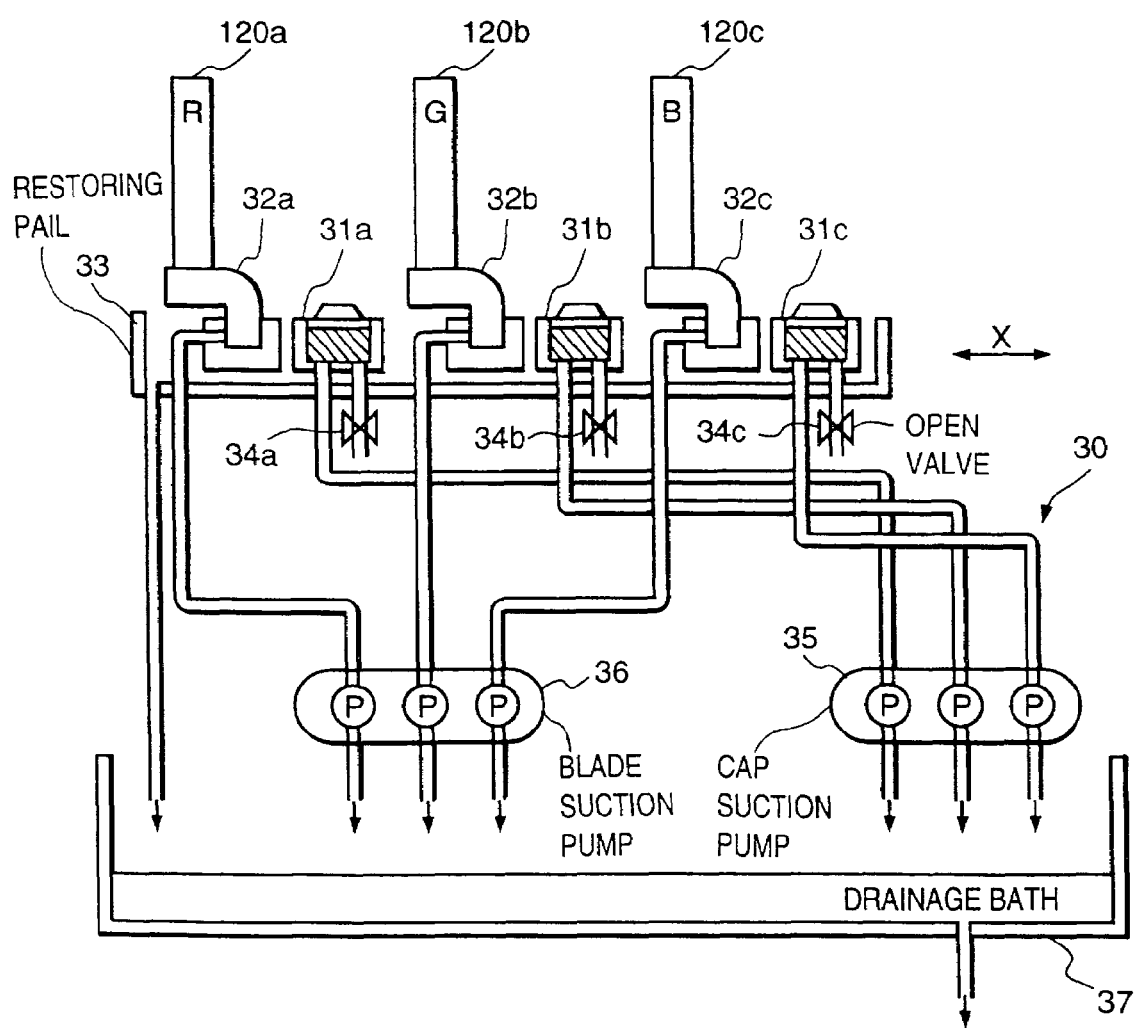
FIG. 14 is a view showing a state wherein the restoring unit for the manufacturing apparatus of the embodiment is performing a wiping operation.

Reference numerals 32a, 32b, and 32c denote blades for wiping the nozzle surfaces. Each blade preferably has water absorption property. As shown in FIG. 14, with the operation of the restoring unit 30 in the X direction, the blades 32a, 32b, and 32c wipe off the ink adhering to the nozzle surfaces of the ink-jet heads 120a, 120b, and 120c or ink mists which are produced upon discharging of inks and adhere to the nozzle surfaces.

Reference numeral 33 denotes a restoring pail disposed below the caps 31a, 31b, and 31c and the blades 32a, 32b, and 32c to prevent inks leaking from the caps or cap and blade cleaning solutions (to be described later) from leaking into the apparatus. Inks and cleaning solutions stored in the restoring pail 33 are guided into a drainage bath 37. The restoring pail 33 is designed to operate integrally with the caps 31a, 31b, and 31c and the blades 32a, 32b, and 32c.

When a capping operation in the Z direction and a wiping operation in the X direction are performed, the restoring pail 33 operates in the same manner as the caps 31a, 31b, and 31c, and the blades 32a, 32b, and 32c.

Reference numerals 34a, 34b, and 34c denote open valves. One end of each open valve communicates with a corresponding one of the caps 31a, 31b, and 31c via tubes. The other end of each open valve is set at the atmospheric pressure. The caps 31a, 31b, and 31c are made of rubber and pressed against the respective heads with a force of about 1 kgf or more, and then the volume of each cap decreases. The internal pressure of each cap exceeds the atmospheric pressure. As a result, an ink in each nozzle is pushed into each ink-jet head, causing a discharge failure. The open valves 34a, 34b, and 34c are arranged to prevent such a phenomenon. Each open valve is closed in a normal operation. Before a capping operation, each open valve is opened. By keeping each open valve closed after a capping operation, the inside of each cap can be kept at the atmospheric pressure.

Reference numeral 35 denotes a cap suction pump for sucking an ink stored in each cap in a pressuring/restoring operation, and sucking an ink pre-discharged into each cap. The cap suction pumps 35 are respectively connected to the caps 31a, 31b, and 31c via tubes. The sucked inks are discharged into the drainage bath 37.

Reference numeral 36 denotes blade suction pumps 36 for sucking water absorbed by the blades 32a, 32b, and 32c each made of a material having water absorption property, and sucking inks absorbed in a wiping operation. The blade suction pumps 36 are respectively connected to the blades 32a, 32b, and 32c via tubes. The absorbed water and inks are discharged into the drainage bath 37. The water and inks discharged into the drainage bath 37 are discharged outside the apparatus altogether.

Reference numeral 38 (see FIG. 12) denotes a washing water tank for storing washing water for washing the caps 31a, 31b, and 31c and the blades 32a, 32b, and 32c. When a washing water supply valve 39 is opened, washing water is sprayed from each washing water supply nozzle 40. Referring to FIG. 11, these washing water supply nozzles 40 are positioned immediately above the restoring unit 30 when the ink-jet head IJH (120a, 120b, and 120c) completely colors the glass substrate 1.

Reference numeral 41 (see FIG. 12) denotes a washing water replenishment valve for replenish washing water into the washing water tank 38. When a washing water residue detection sensor 42 detects that the amount of washing water in the washing water tank 38 becomes small, the washing water replenishment valve 41 is kept open for a predetermined period of time to replenish washing water into the washing water tank 38. As this washing water, distilled water obtained by removing impurities from tap water is used.

Figure 15:
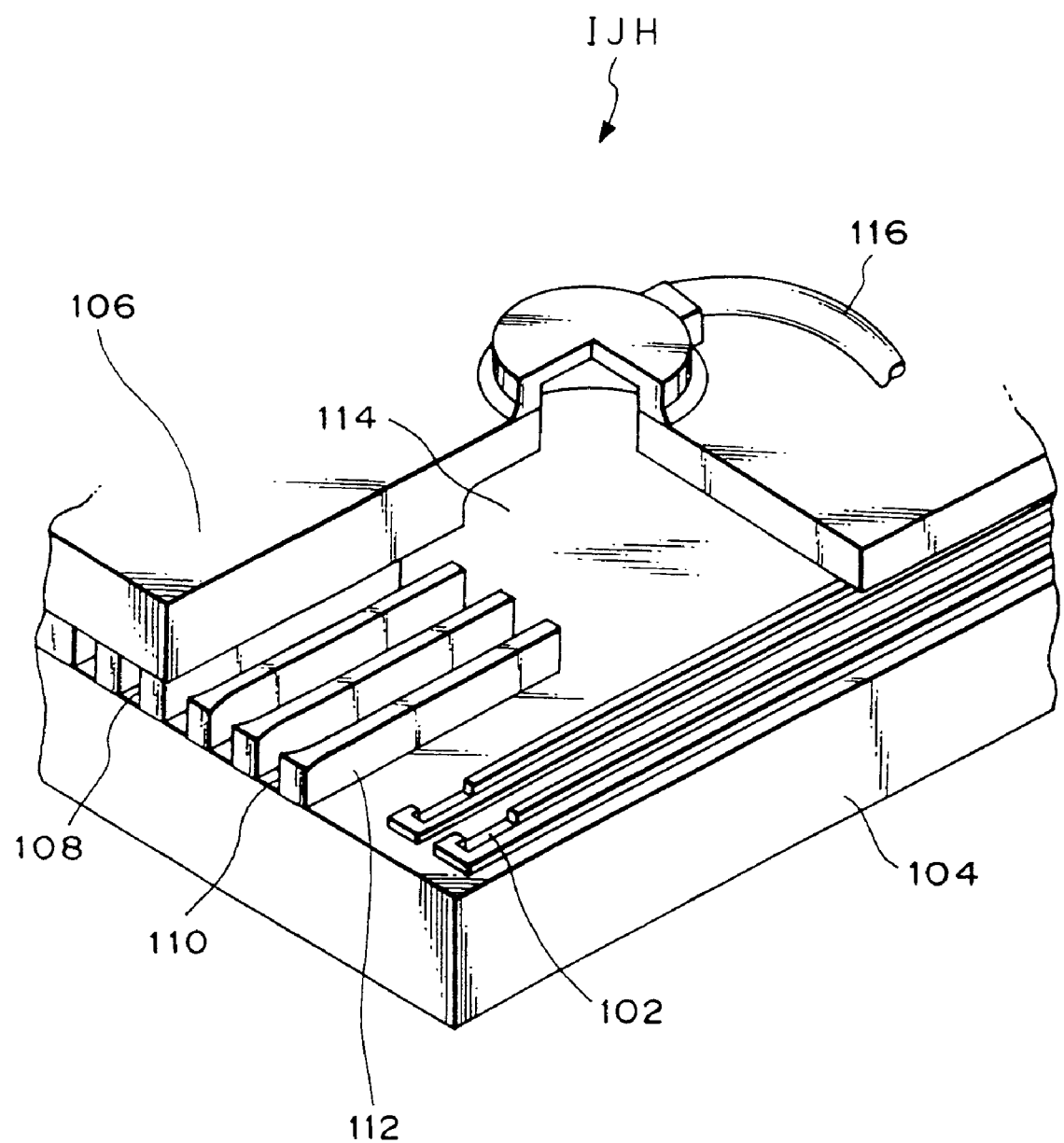
FIG. 15 is a perspective view showing the structure of an ink-jet head.

FIG. 15 shows the structure of the ink-jet head IJH for discharging an ink onto the resin composition layer 3. Since these three ink-jet heads 120a, 120b, and 120c have the same structure, FIG. 15 shows the structure of one of them as a representative.

Referring to FIG. 15, the ink-jet head IJH mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 117. This ink is supplied from the ink chamber 114 to each fluid passage 110.

The heater board 104 and the ceiling plate 106 are positioned such that the position of each heater 102 coincides with that of a corresponding fluid passage 110, and are assembled into the state shown in FIG. 15. Although FIG. 15 shows only two heaters 102, the heater 102 is arranged in correspondence with each fluid passage 110. When a predetermined driving signal is supplied to the heater 102 in the assembled state shown in FIG. 15, an ink above the heater 102 is boiled to produce a bubble, and the ink is pushed and discharged from the discharging opening 108 upon volume expansion of the ink.

Figure 16:
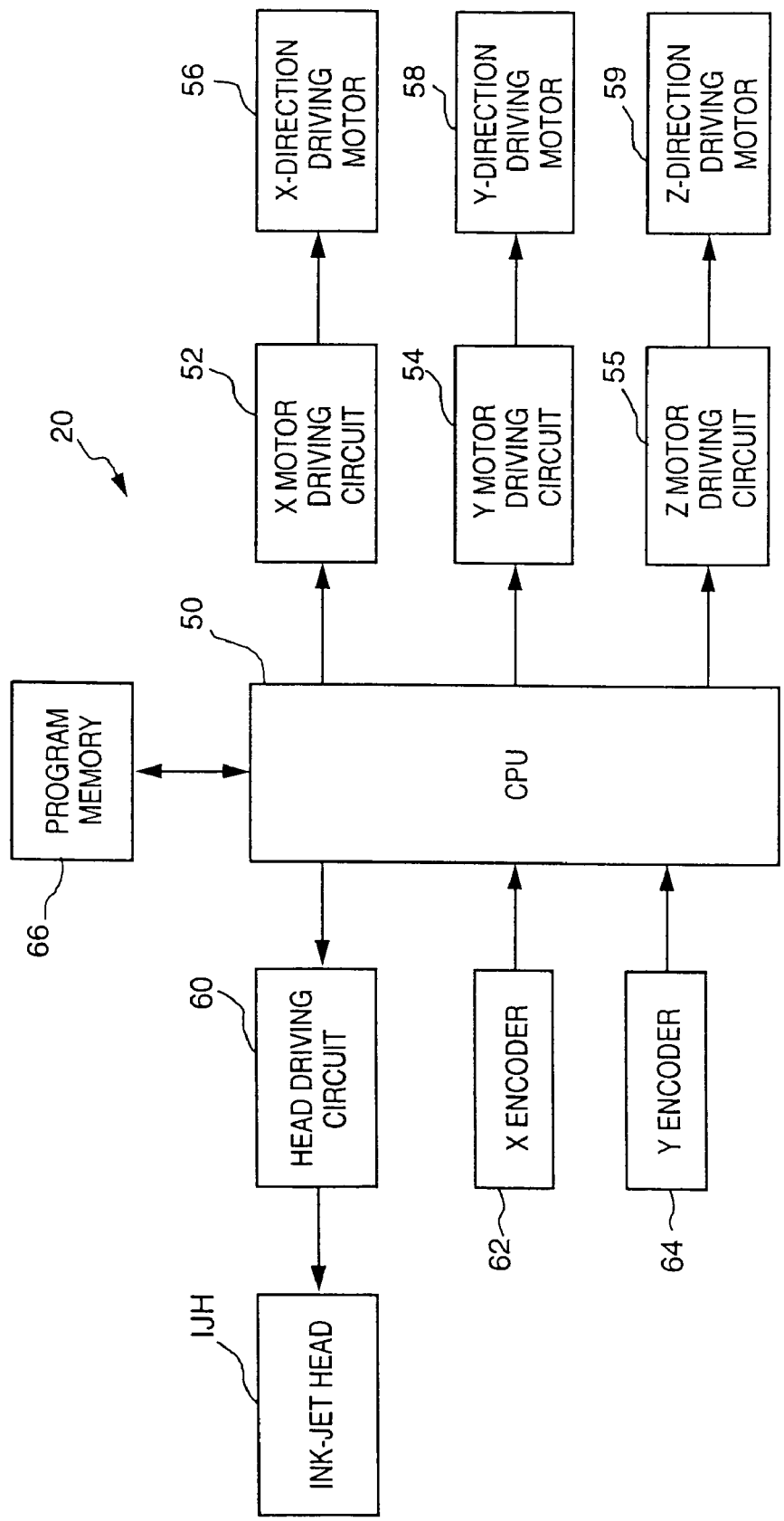
FIG. 16 is a block diagram showing the schematic arrangement of the manufacturing apparatus of the embodiment.

FIG. 16 is a block diagram showing the arrangement of the color filter manufacturing apparatus of this embodiment.

Referring to FIG. 16, X- and Y-direction driving motors 56 and 58 for driving the X-Y table 22 in the X and Y directions are connected to a CPU 50 for controlling the overall operation of the manufacturing apparatus via X and Y motor driving circuits 52 and 54. A Z-direction driving motor 59 for driving the restoring unit 30 in the Z direction is connected to the CPU 50 via a Z motor driving circuit 55.

The ink-jet head IJH is also connected to the CPU 50 via a head driving circuit 60. Furthermore, X and Y encoders 62 and 64 for detecting the position of the X-Y table 22 is connected to the CPU 50. With this arrangement, position information of the X-Y table 22 is input to the CPU 50. In addition, a control program in a program memory 66 is input to the CPU 50. The CPU 50 moves the X-Y table 22 in accordance with this control program and position information from the X and Y encoders 62 and 64. With this operation, a desired grating frame (pixel) on the glass substrate 1 is brought to a position below the ink-jet head IJH, and an ink having a desired color is discharged into the pixel to color it, thereby coloring the glass substrate 1. A color filter is manufactured by performing this operation for each pixel. Every time coloring of one glass substrate 1 is completed, the restoring unit 30 mounted on an end portion of the X-Y stage 22 is moved to a position immediately below the ink-jet head IJH, and the blades 32a, 32b, and 32c are moved in the X direction by the X-direction driving motor 56 to perform a wiping operation. In addition, the caps 31a, 31b, and 31c are moved in the Z direction by the Z-direction driving motor 59 to perform a pre-discharging operation. Meanwhile, the colored glass substrate 1 is replaced with a new glass substrate 1 by a substrate convey unit (not shown).

The operation of the color filter manufacturing apparatus of this embodiment will be described next with reference to FIG. 17.

In step S1, inks are discharged from the ink-jet head IJH onto the glass substrate 1 to color one glass substrate 1. When coloring of one substrate is completed, the X-Y stage 22 is operated to move the restoring unit 30 to the position of each washing water supply nozzle 40, and washing water is sprayed against the blades 32a, 32b, and 32c, thereby washing the blades (step S2). The X-Y stage 22 is then moved to move the restoring unit 30 to the position of the ink-jet head IJH (step S3). If it is determined in step S4 that the number of colored substrates is less than a predetermined number, a normal wiping operation is performed by using the blades 32a, 32b, and 32c to wipe off ink mists adhering to the nozzle surfaces (step S5). If it is determined in step S4 that not less than a predetermined number of substrates are colored, a pressuring/restoring operation is performed to remove an ink with increased viscosity in each nozzle and bubbles in the ink chamber (step S6). In this embodiment, every time 30 glass substrates are colored, a pressuring/restoring operation is performed. This pressuring/restoring operation is performed only to discard inks without using them for a coloring operation, and requires an increase in the number of steps, demanding a corresponding period of time. For this reason, the number of times this operation is performed is preferably minimized.

When a pressuring/restoring operation is performed, an ink adheres to the nozzle surfaces. For this reason, a wiping operation for a pressuring operation is performed afterward (step S7). Since the ink discharged from the nozzles adheres to the caps in the pressuring/restoring operation (step S6), a cap washing operation is performed (step S8). It is checked whether the coloring operation is terminated for maintenance of the apparatus or the like (step S9). If it is determined that the coloring operation is terminated, the capping operation and the like are terminated (step S12) to terminate the coloring operation. If it is determined that the coloring operation is continued, the ink-jet heads 120a, 120b, and 120c are capped, and each ink-jet head performs a pre-discharging operation to discharge a predetermined number of inks (step S10). Thereafter, a cap washing operation is performed to wash away the inks pre-discharged and adhering to the caps (step S11). While these restoring operations are performed, the colored substrate is replaced with a new substrate, and the next coloring operation is performed. This process is repeated.

Characteristic features of the present invention in coloring a glass substrate will be described next with reference to FIGS. 18 and 19.

Figure 18:
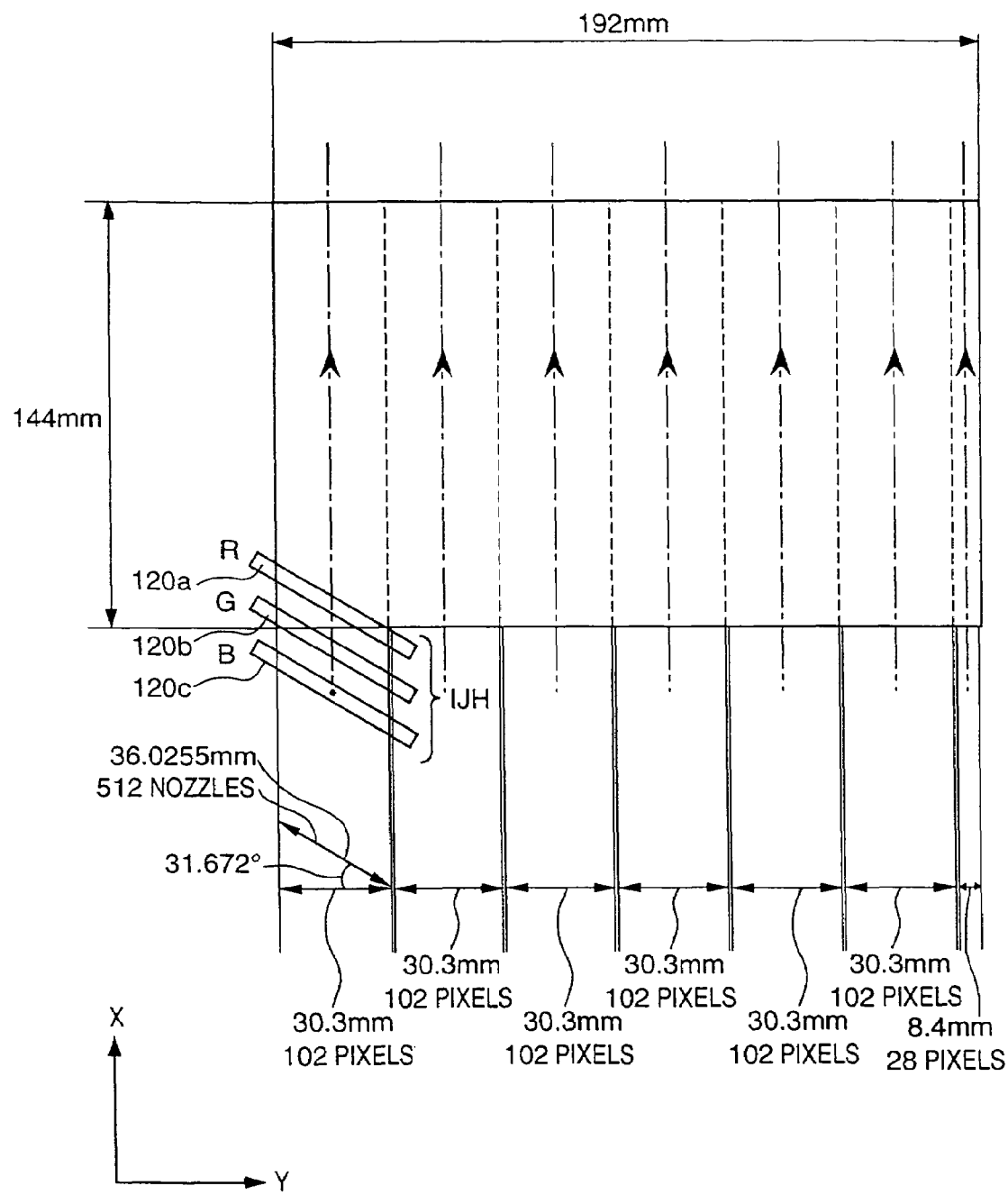
FIG. 18 is a view showing how ink-jet heads are moved relative to a glass substrate in the manufacturing apparatus of the embodiment.

Each of the heads 120a, 120b, and 120c of the ink-jet head IJH in FIG. 18 has 512 effective nozzles, and a nozzle pitch of 70.5 μm. That is, each ink-jet head has a resolution of 360 dpi. As shown in FIG. 9, according to the color filter of this embodiment, the pixels of each color are arranged at a pitch of 300 μm. Since the pixel pitch is different from the nozzle pitch of the ink-jet head IJH, every five nozzles of the ink-jet head IJH are used. That is, as shown in FIG. 18, only 120 nozzles of the 512 nozzles of the ink-jet head IJH are used. For this reason, the ink-jet head IJH is tilted at 31.672°, as shown in FIG. 18. FIG. 19 shows the positional relationship between the pixels of the respective colors and the nozzles of the ink-jet head IJH. Of the nozzles 108 of each of the ink-jet heads 120a, 120b, and 120c, only every five nozzles indicated by the solid lines are located above the pixels of the corresponding colors. The remaining nozzles indicated by the broken lines are located outside the pixels of the corresponding colors. That is, the nozzles indicated by the solid lines are substantially arranged at a pitch of 300 μm in the Y direction. Since the nozzles of each of the ink-jet heads 120a, 120b, and 120c are arranged at 70.5-μm intervals, every five nozzles of the nozzles indicated by the broken lines are also arranged at a pitch of 300 μm in the Y direction.

The process of manufacturing a color filter having an effective display area like the one shown in FIG. 10, i.e., coloring pixels of the respective colors like those shown in FIG. 9, by using the ink-jet head IJH having the nozzles 108 arranged in the above manner will be described next. As described above, the ink-jet head IJH is positioned at an angle of 31.672° with respect to the glass substrate 1. As shown in FIG. 19, the respective ink-jet heads are shifted from each other by 100 μm in the Y direction such that every five nozzles of each ink-jet head IJH are positioned above corresponding pixels. In this case, the ink-jet heads 120a, 120b, an 120c have the same structure regardless of the colors of inks. In the actual manufacturing apparatus, the ink-jet heads are fixed, and a glass substrate is moved. However, FIG. 18 shows a state wherein the glass substrate is fixed, and the ink-jet heads are moved. Since the ink-jet heads and the glass substrate relatively move, it makes no difference whether the glass substrate is fixed or moved.

As shown in FIG. 18, the width of a portion at which each head can color by one scanning operation corresponds to 102 pixels, which correspond to ⅕ the 512 nozzles. The distance between the centers of the pixels on the two ends is 30.3 mm. That is, the entire effective display area of the glass substrate cannot be colored by one scanning operation in the X direction. For this reason, as shown in FIG. 18, after the ink-jet head IJH is scanned on the glass substrate once in the X direction, the ink-jet head is relatively moved by 30.6 mm in the Y direction, and is scanned again in the X direction. This operation is repeated once to color the entire effective display area of the glass substrate. Meanwhile, each of the ink-jet heads 120a, 120b, and 120c is controlled such that only every five nozzles are always used.

Figure 20:
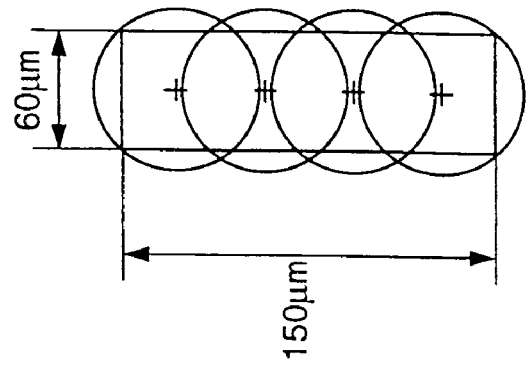
FIG. 20 is a view showing how ink-jet head discharges an ink.

At this time, as shown in FIG. 20, with regard to one pixel, a plurality of inks are continuously discharged from the same nozzle to cover the entire area of a frame of the black matrix 2 such that the center of each ink falls within the frame.

Figure 17:
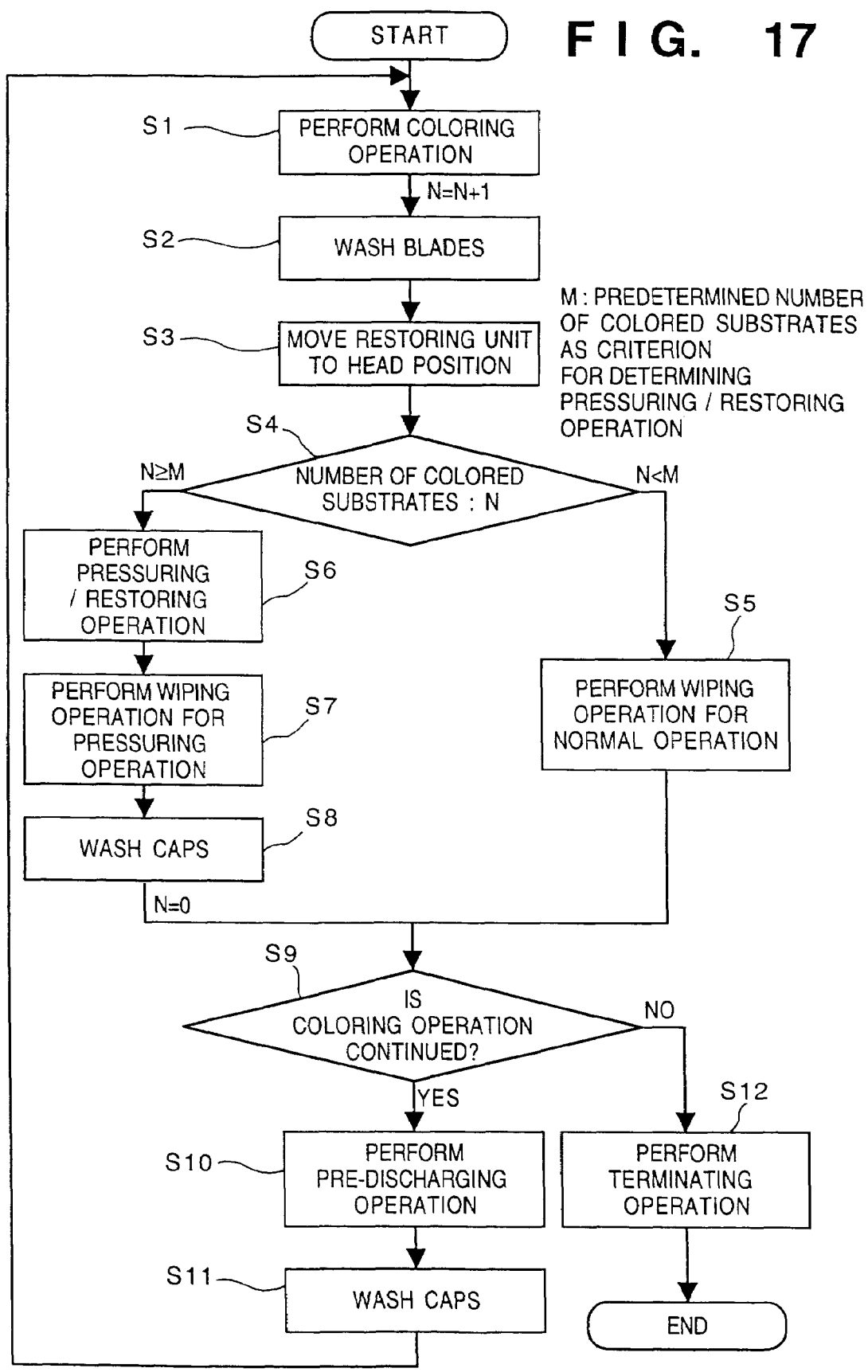
FIG. 17 is a flow chart schematically showing the operation of the manufacturing apparatus of the embodiment.

In a pre-discharging operation in step S10 in FIG. 17, which is performed before coloring of one glass substrate is started, the ink-jet head IJH is normally controlled to cause only the nozzles used for a coloring operation to perform a pre-discharging operation. In this embodiment, since a pressuring/restoring operation of discharging the ink from all the nozzles is performed every time 30 glass substrates are colored, the nozzles which are not used for a coloring operation are not used at all during such coloring operations. If a nozzle is not used for a certain period of time, an ink may solidify and clog up the nozzle. In this case, the nozzle may not be restored by a pressuring/restoring operation. For this reason, in this embodiment, all the nozzles are caused to perform a pre-discharging operation every time 10 substrates are colored.

With this operation, a pressuring/restoring operation which consumes an ink can be performed at longer intervals. In addition, since only the nozzles to be used are caused to perform a discharging operation in a normal operation, the amount of ink consumed in restoring operations can be minimized. Furthermore, by decreasing the number of times a pressuring/restoring operation is performed, the number of substrates colored per unit time can be increased. By making use of the nozzles which are not used for coloring operations in this manner, even if the service lives of every five nozzles used for coloring operations expire, this ink-jet head can be used again by arranging the remaining nozzles to allow them to be used for coloring operations.

Second Embodiment

Figure 21:
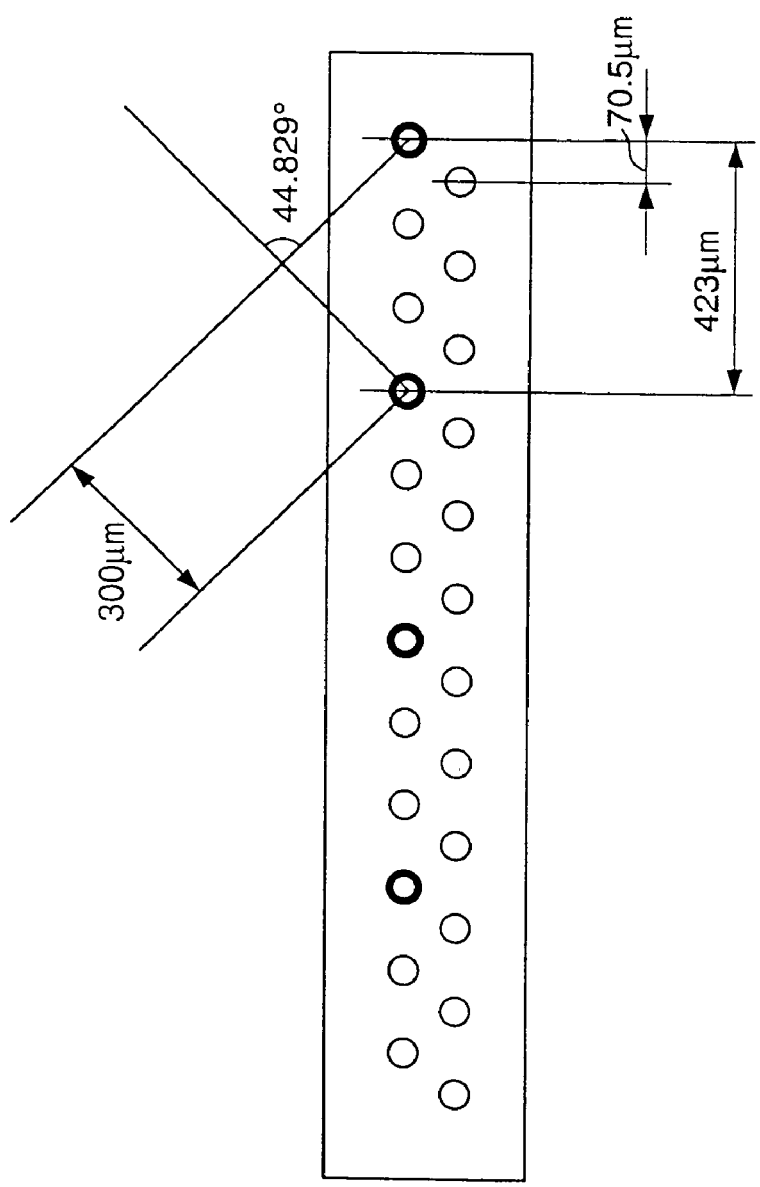
FIG. 21 is a view showing the arrangement of the discharging nozzles on the nozzle surface of an ink-jet head.
Figure 22:
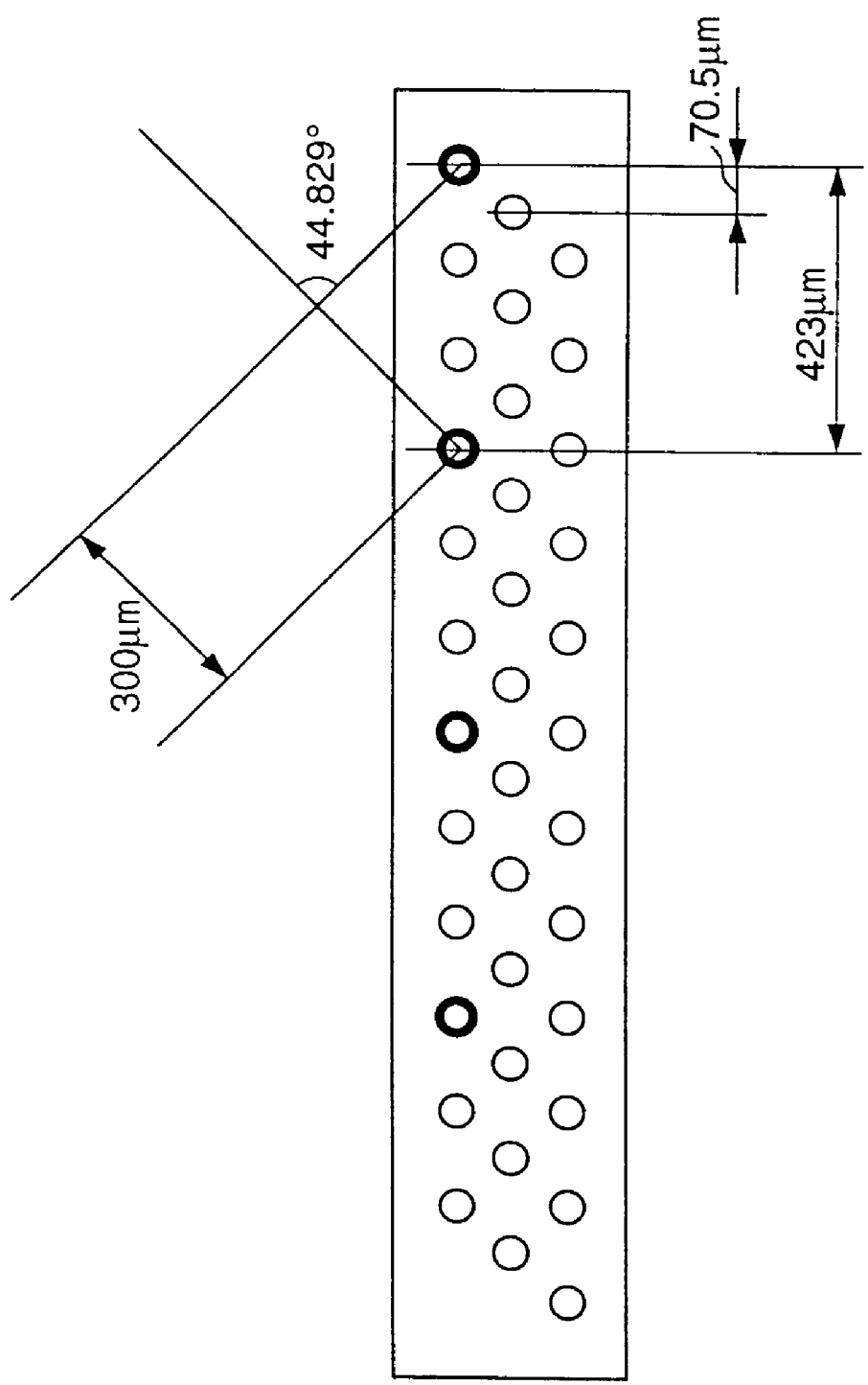
FIG. 22 is a view showing the arrangement of the discharging nozzles on the nozzle surface of an ink-jet head.

FIGS. 21 and 22 are views each showing the nozzle arrangement of an ink-jet head IJH in a color filter manufacturing apparatus according to the second embodiment of the present invention.

FIG. 21 shows the nozzle arrangement constituted by two arrays of nozzles. The nozzles are arranged at a pitch of 70.5 μm, i.e., a resolution of 360 dpi, in the longitudinal direction of the head.

When this head is used for coloring of a color filter having pixels of each color arranged at a pitch of 300 μm as in FIG. 9, every six nozzles indicated by the thick solid lines are used, and the head is tilted at 44.829°.

FIG. 22 shows the nozzle arrangement constituted by three arrays of nozzles. The nozzles are arranged at a pitch of 70.5 μm, i.e., a resolution of 360 dpi, in the longitudinal direction of the head.

When this head is used for coloring of a color filter having pixels of each color arranged at a pitch of 300 μm as in FIG. 9, every six nozzles indicated by the thick solid lines are used, and the head is tilted at 44.829°, as in the case shown in FIG. 21.

With the ink-jet heads having the above nozzle arrangements as well, the same effects as described above can be obtained by performing discharge control in the same manner as in the above embodiment.

Third Embodiment

A color filter manufacturing apparatus of the third embodiment has the same arrangement as that of the first embodiment. The third embodiment is characterized by its control method. For this reason, a description of the apparatus will be omitted, and the third embodiment will be described with reference to the drawings used to described the first embodiment.

As shown in FIG. 18, the width of a portion which each head can color by one scanning operation corresponds to 102 pixels, which correspond to ⅕ the 512 nozzles. The distance between the centers of the pixels on the two ends is 30.3 mm. That is, the entire effective display area of the glass substrate cannot be colored by one scanning operation in the X direction. For this reason, as shown in FIG. 18, after an ink-jet head IJH is scanned on the glass substrate once in the X direction, the ink-jet head is relatively moved by 30.6 mm in the Y direction to position the nozzles used for the previous scanning operation above the corresponding pixels so as to discharge the ink from the same nozzles as those used in the previous scanning operation. Meanwhile, the ink-jet head is scanned again in the X direction. As shown in FIG. 18, after the second scanning operation, a 28-pixel portion of each color is left uncolored. The ink-jet head IJH is therefore relatively moved in the Y direction to position the nozzles used in the previous scanning operation above the corresponding pixels, and each head is scanned again in the X direction to color the entire effective display area of the glass substrate by using 28 nozzles of the nozzles used in the previous scanning operation. An X-Y stage 22 is moved to move each head in the Y direction immediately after coloring of the last pixel in one scanning operation so as to change the position of each head relative to the glass substrate between scanning operations. Meanwhile, each of ink-jet heads 120a, 120b, and 120c is controlled to always use only every five nozzles.

At this time, as shown in FIG. 20, with regard to one pixel, a plurality of inks are continuously discharged from the same nozzle to cover the entire area of a frame of the black matrix 2 such that the center of each ink falls within the frame.

As described above, the nozzles which are not used in the previous scanning operation are not used in the succeeding scanning operation, but the nozzles which are used in the previous scanning operation are always used in the succeeding scanning operation. For this reason, all the nozzles used for a coloring operation are in an idle state for only a short period of time, and hence each head is kept in a state in which it can stably discharge an ink. Therefore, a high-quality coloring operation can always be performed. In addition, since the heads need not be relatively moved to the positions of the caps or portions for receiving pre-discharged inks so as to perform a pre-discharging operation, the coloring time per substrate can be shortened, and the production per unit time increases, realizing a reduction in the cost of a color filter.

With the ink-jet heads having the above nozzle arrangements shown in FIGS. 21 and 22 as well, the same effects as described above can be obtained by performing discharge control in the same manner as in this embodiment.

In this embodiment, a coloring operation is performed by using the maximum number of nozzles which can be used in the first to sixth scanning operations, and using only about ¼ the nozzles in the remaining scanning operations. However, the same effects as described above can be obtained by using any combination of the numbers of nozzles to be used as long as the nozzles which are used in the previous scanning operation are always used in the succeeding scanning operation, and the number of nozzles used is decreased.

Fourth Embodiment

A color filter manufacturing apparatus of the fourth embodiment is the same as that of the first embodiment except for the numbers of heads and nozzles. Only the differences between the fourth and first embodiments will be described below.

Figure 23:
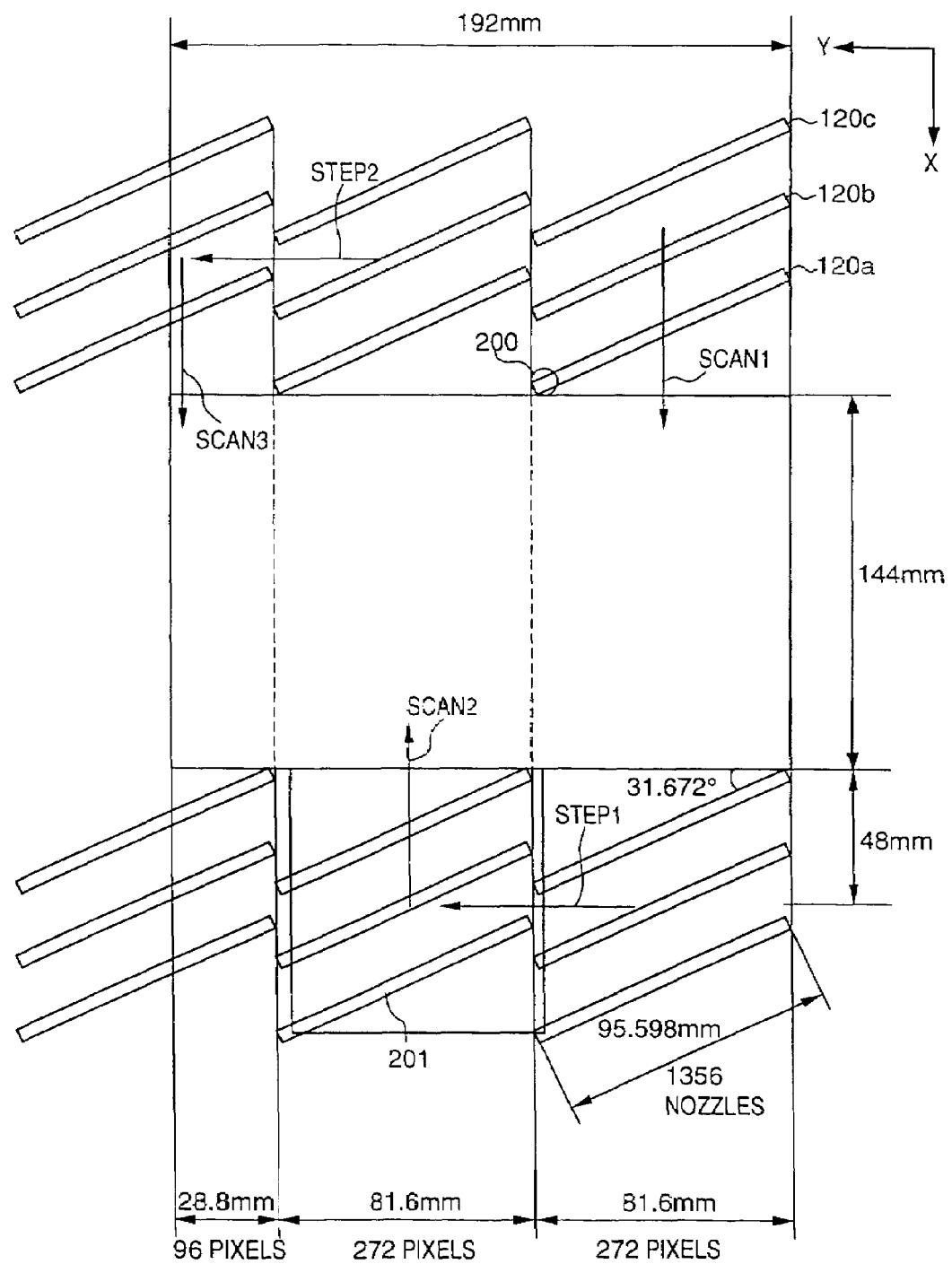
FIG. 23 is a view showing how ink-jet heads are moved relative to a glass substrate in a manufacturing apparatus of another embodiment.

As shown in FIG. 23, the maximum width of a portion at which each head can color by one scanning operation corresponds to 272 pixels, which correspond to ⅕ the 1,360 nozzles. The distance between the centers of the pixels on the two ends is 81.6 mm. That is, the entire effective display area of the glass substrate cannot be colored by one scanning operation in the X direction. For this reason, as shown in FIG. 23, after an ink-jet head IJH is scanned on the glass substrate once in the X direction (scan 1), the ink-jet head is relatively moved by 81.6 mm in the Y direction (step 1) to position the nozzles used for the previous scanning operation above the corresponding pixels so as to discharge the ink from the same nozzles as those used in the previous scanning operation. Meanwhile, the ink-jet head is scanned again in the X direction (scan 2). As shown in FIG. 23, after the second scanning operation (scan 2), 96-pixel portion of each color is left uncolored. The ink-jet head IJH is therefore relatively moved in the Y direction (step 2) to position the nozzles used in the previous scanning operation (scan 2) above the corresponding pixels, and each head is scanned again in the X direction (scan 3) to color the entire effective display area of the glass substrate by using 96 nozzles of the nozzles used in the previous scanning operation (scan 2). An X-Y stage 22 is moved to move each head in the Y direction immediately after coloring of the last pixel in one scanning operation so as to change the position of each head relative to the glass substrate between scanning operations.

Meanwhile, each ink-jet head IJH is controlled to always use only every five nozzles.

Consider a nozzle 200 on the left end of an ink-jet head 120a in the case shown in FIG. 23. A thick solid line 201 indicates the distance the nozzle 200 has moved without discharging any ink between the first scanning operation (scan 1) and the second scanning operation (scan 2). The length of this thick solid line can be calculated as follows, provided that the distance between the heads on the two ends in the scanning direction is 48 mm:

$$(95.598 \times \sin 31.672° + 48) \times 2 + 81.6 = 277.989 \text{ (mm)}$$

The case shown in FIG. 24 in the fourth embodiment of the present invention will be described next.

Figure 24:
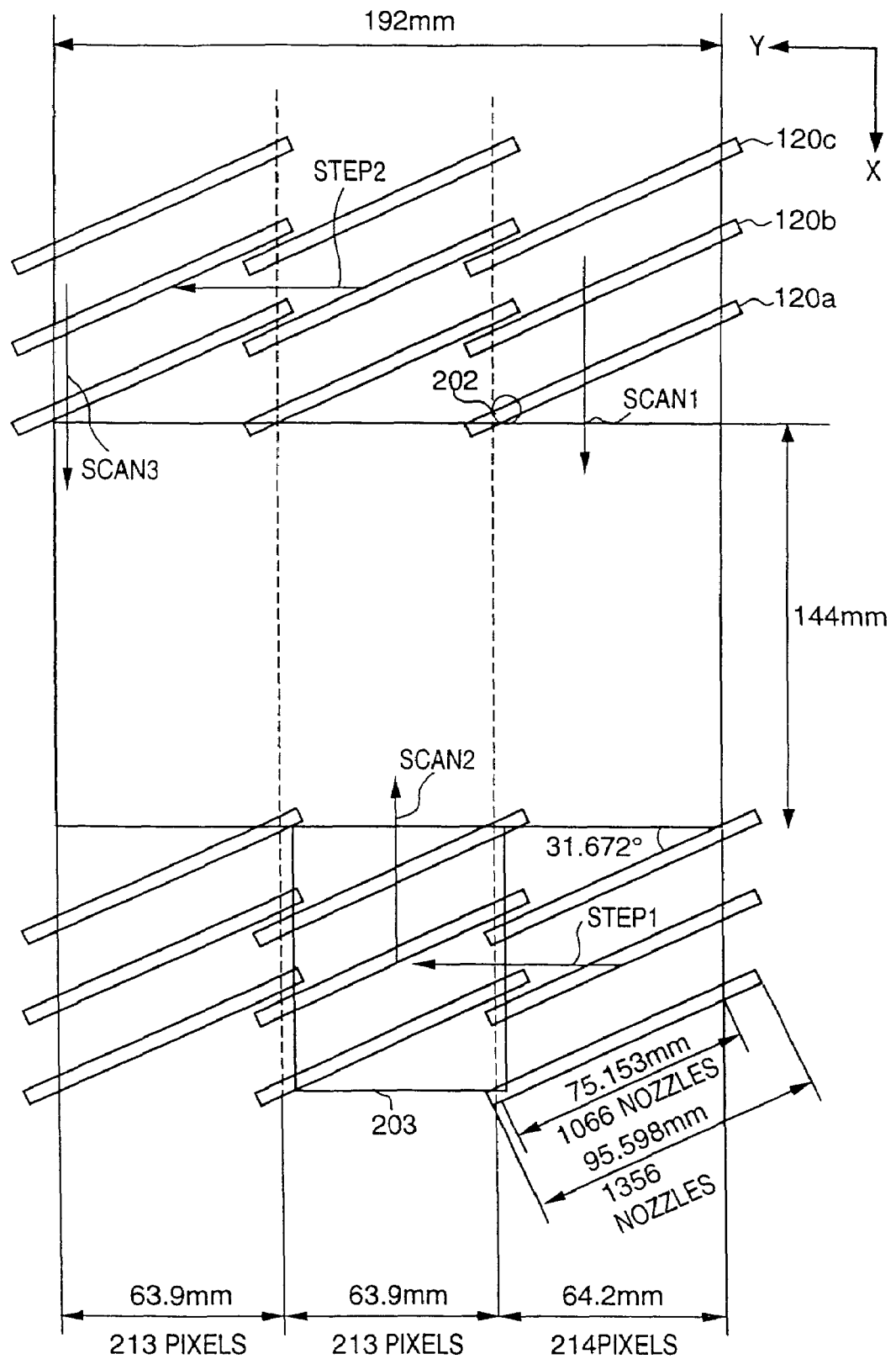
FIG. 24 is a view showing how ink-jet heads are moved relative to a glass substrate in a manufacturing apparatus of still another embodiment.

In the case shown in FIG. 24, the numbers of nozzles used in the respective scanning operations (including the last scanning operation) are set to be almost the same. That is, all the nozzles are divided into groups including almost the same number of nozzles such that 214 nozzles are used for the first scanning operation (scan 1); 213 nozzles, for the second scanning operation (scan 2); and 213 nozzles, for the third scanning operation (scan 3). Consider a nozzle 202 (to be used to discharge an ink) on the left end of the ink-jet head 120a, as in the case shown in FIG. 23. A thick solid line 203 indicates the distance the nozzle 202 has moved without discharging any ink between the first scanning operation (scan 1) and the second scanning operation (scan 2). The length of this thick solid line can be calculated as follows, provided that the distance between the heads on the two ends in the scanning direction is 48 mm as in the case shown in FIG. 23:

$$(75.153 \times \sin 31.672° + 48) \times 2 + 64.2 = 239.119 \text{ (mm)}$$

As is apparent from this calculation, the distance each ink discharging nozzle moves without discharging any ink between scanning operations in the case shown in FIG. 24 is shorter than that in the case shown in FIG. 23. This means that the time during which each nozzle discharges no ink is shortened. If an ink in a given nozzle is kept in contact with air without being discharged, volatile components in the ink evaporate to increase the viscosity of the ink. As a result, a discharge failure, i.e., inability to discharge the ink, or twisting, i.e., inability to discharge the ink straight, may occur. In order to prevent such a phenomenon, it is important to minimize the time during which the ink discharging nozzle is caused to stand without discharging any ink.

Since the time during which the ink discharging nozzle is in contact with air between scanning operations is shorter than that in the case shown in FIG. 23, a discharge failure and twisting occur less frequently. That is, there is provided a color filter manufacturing apparatus which stabilizes the discharging operation of each ink-jet head, and suppresses the occurrence of defective products, thereby attaining an increase in yield.

With the ink-jet heads having the above nozzle arrangements shown in FIGS. 21 and 22 as well, the same effects as described above can be obtained by performing discharge control in the same manner as in this embodiment.

In each of the cases shown in FIGS. 23 and 24, one screen is colored by performing a scanning operation three times. However, the present invention is not limited to this. A scanning operation may be performed four or more times. This embodiment is especially effective for a case wherein an area which can be colored by one scanning operation is slightly less than a fraction of an integer of one screen, and one screen is colored by three or more scanning operations.

Fifth Embodiment

Each ink-jet head used in the fifth embodiment has nozzles arranged at a pitch of 70.5 µm. The nozzle array is tilted in a scanning direction, and for example, every six nozzles are used to color pixels of the same color. A color filter manufactured by the apparatus of this embodiment has the same color pattern as that shown in FIG. 9.

Figure 25:
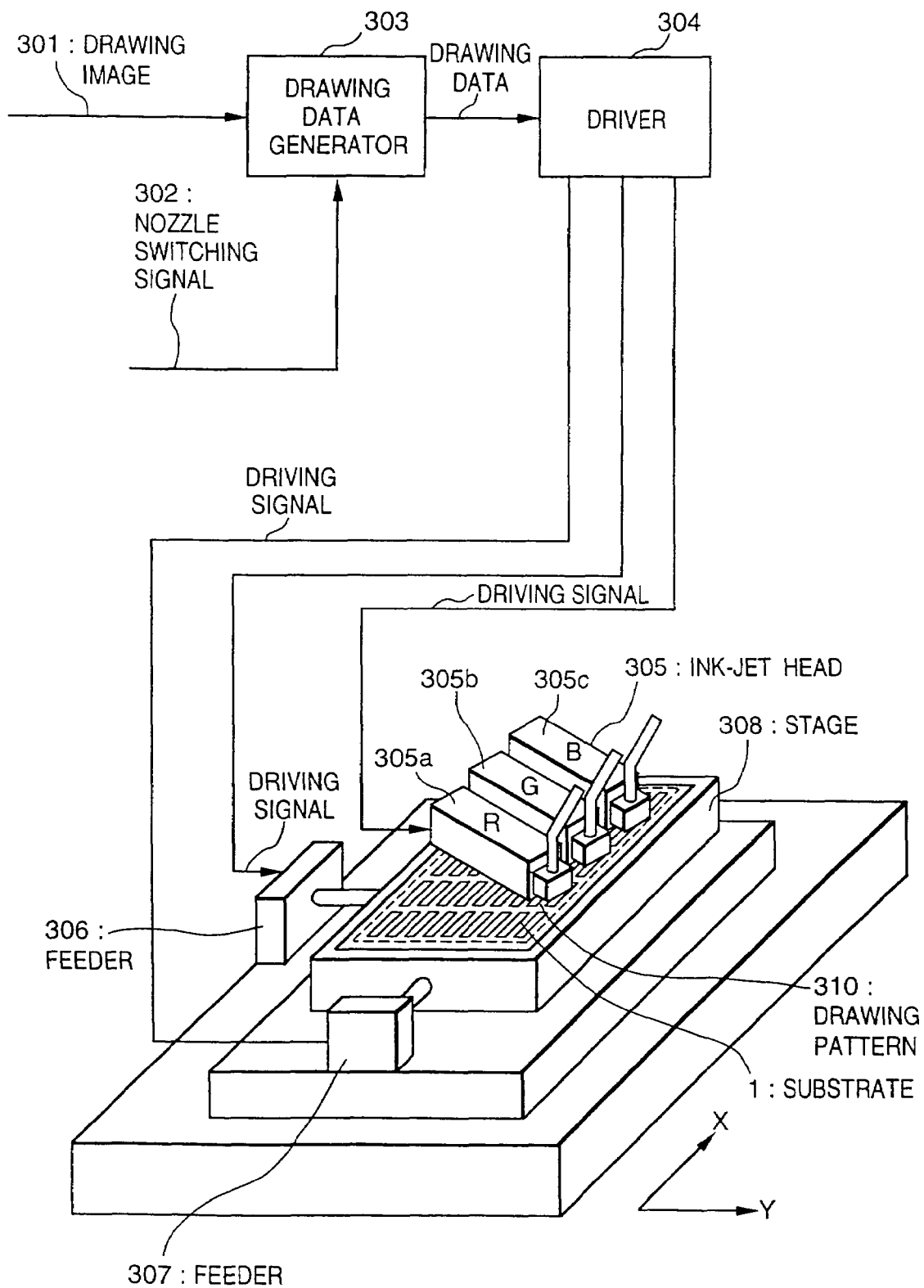
FIG. 25 is a view showing the arrangement of a color filter manufacturing apparatus of the fifth embodiment of the present invention.

FIG. 25 shows the arrangement of the color filter manufacturing apparatus of the fifth embodiment. Reference numeral 301 denotes a drawing image (the pixel array pattern of a color filter) which is data indicating the relative position relationship between ink dots to be formed on a substrate 1; and 302, a nozzle switching signal for designating a switching operation for nozzles corresponding to the respective pixels of the color filter. A nozzle group switching method will be described in detail with reference to FIGS. 25 and 1. Assume that the second, seventh, and twelfth nozzle groups, counted from the right end, are being used. In this case, sequential use of nozzle groups is easy to perform. That is, the third, eighth, and thirteenth nozzle groups are used for the next operation, and the fourth, ninth, and fourteenth nozzle groups for the still next operation. However, another switching method may be used. In addition, a nozzle group switching operation is performed when the service lives of the currently used nozzles expire. For example, the service life of each nozzle is based on the operating time of one nozzle group. When the operating time of one nozzle group reaches a predetermined time, it is determined that the service life has expired. Reference numeral 303 denotes a drawing data generator for generating drawing data as data indicating the absolute position of each ink dot on a substrate by relating each pixel on the substrate with a corresponding nozzle in accordance with a nozzle switching signal. In this case, upon switching of nozzles, a change in the position of each nozzle after the nozzle switching operation is calculated from known data associated with a nozzle arrangement, and the position of a stage 308 is changed in accordance with the calculated change in forming each ink dot before and after the nozzle switching operation. Reference numeral 304 denotes a driver for driving an ink-jet head 305 and feeders 306 and 307 in accordance with the drawing data to form ink dots corresponding to the drawing data on the substrate 1. The ink-jet head 305 includes a red head 305*a* for discharging a red ink, a green head 305*b* for discharging a green ink, and a blue head 305*c* for discharging a blue ink. The feeders 306 and 307 respectively move the position of the stage 308 in the X and Y directions in accordance with a signal from the driver 304. The stage 308 holds the substrate 1 to be colored. With the above arrangement, a drawing pattern 310 corresponding to the drawing image 301 is formed on the substrate 1.

In this embodiment, a change in the positional relationship between a substrate and each drawing head, which occurs upon nozzle switching and corresponds to an offset amount of each nozzle position, is estimated from known data associated with a nozzle arrangement. However, the positional relationship between ink dots actually formed by the respective nozzles may be measured by using an image processing apparatus.

In many actual configurations, the nozzle switching signal 302 and the drawing data generator 303 are realized as the function of one or a plurality of computers connected to each other.

In this embodiment, the means for switching nozzle groups to be used corresponds to the nozzle switching signal 302 and the drawing data generator 303, the means for estimating or measuring a change in the positional relationship between the substrate 1 (pixel) and each nozzle of each ink-jet head, which corresponds to an offset amount of each nozzle, corresponds to the drawing data generator 303, and the means for changing the positional relationship between the substrate 1 and each ink-jet head (nozzle) corresponds to the drawing data generator 303, the driver 304, and the feeders 306 and 307.

Sixth Embodiment

Figure 26:
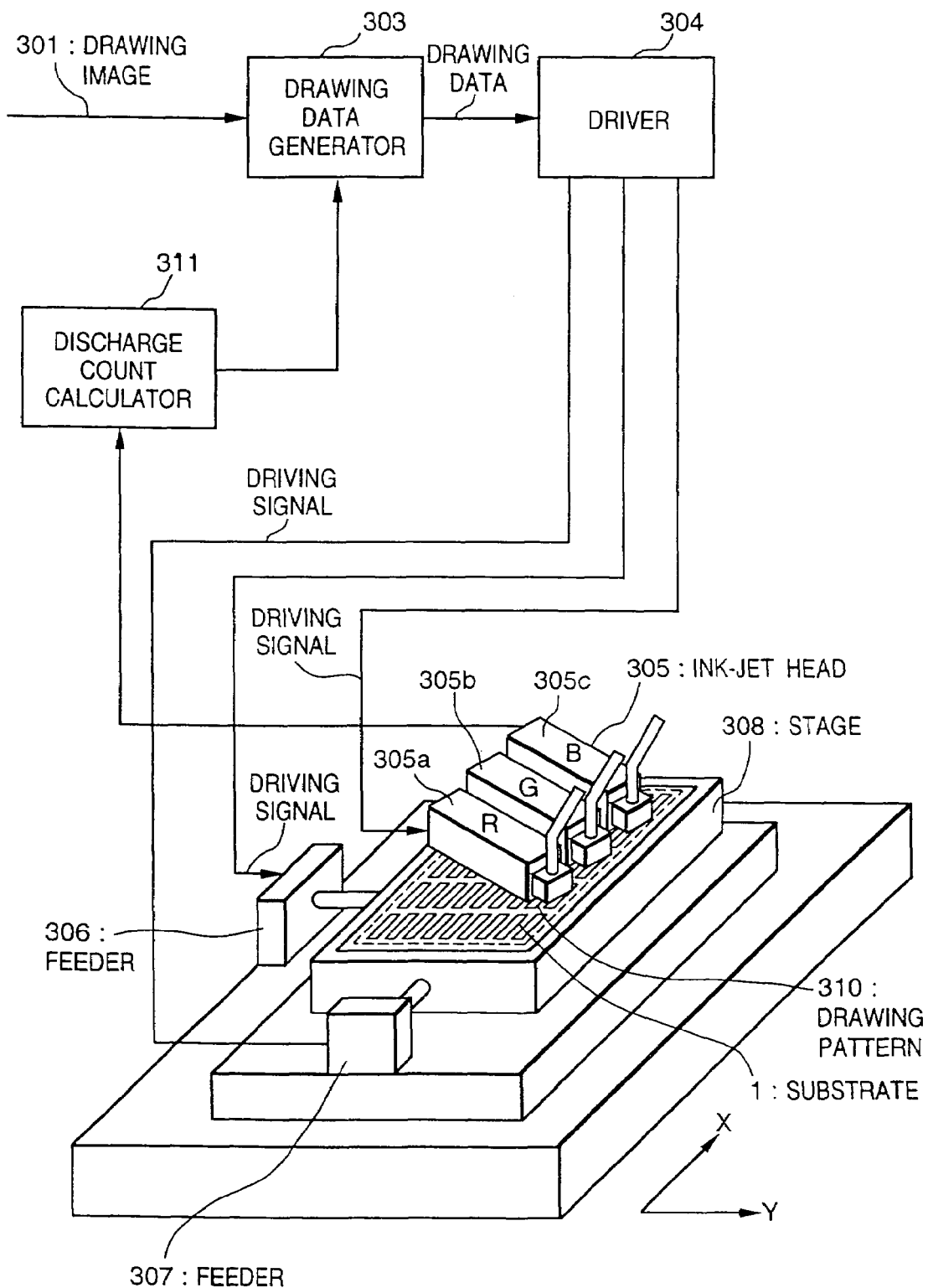
FIG. 26 is a view showing the arrangement of a color filter manufacturing apparatus of the sixth embodiment of the present invention.

FIG. 26 shows the arrangement of a color filter manufacturing apparatus of the sixth embodiment. In the fifth embodiment, detection of a defective nozzle and nozzle switching are externally performed. In contrast to this, in this embodiment, a discharge count calculator 311 is used to calculate the number of times each nozzle discharges an ink on the basis of the operating time of the nozzle and the number of times the nozzle discharges the ink per unit time, thereby estimating a defective nozzle and performing nozzle switching.

In this embodiment, a defective nozzle is estimated by calculating the number of times each nozzle discharges an ink on the basis of the operating time of the nozzle and the number of times the nozzle discharges the ink per unit time. However, the number of times each nozzle discharges an ink may be directly measured, or an image processing apparatus or the like may be used to detect a defective nozzle on the basis of the state of each ink dot.

In this embodiment, since nozzle switching is automatically performed, labor saving can be easily realized, and a continuous operation can be performed for a long period of time, as compared with the fifth embodiment.

Seventh Embodiment

Figure 27:
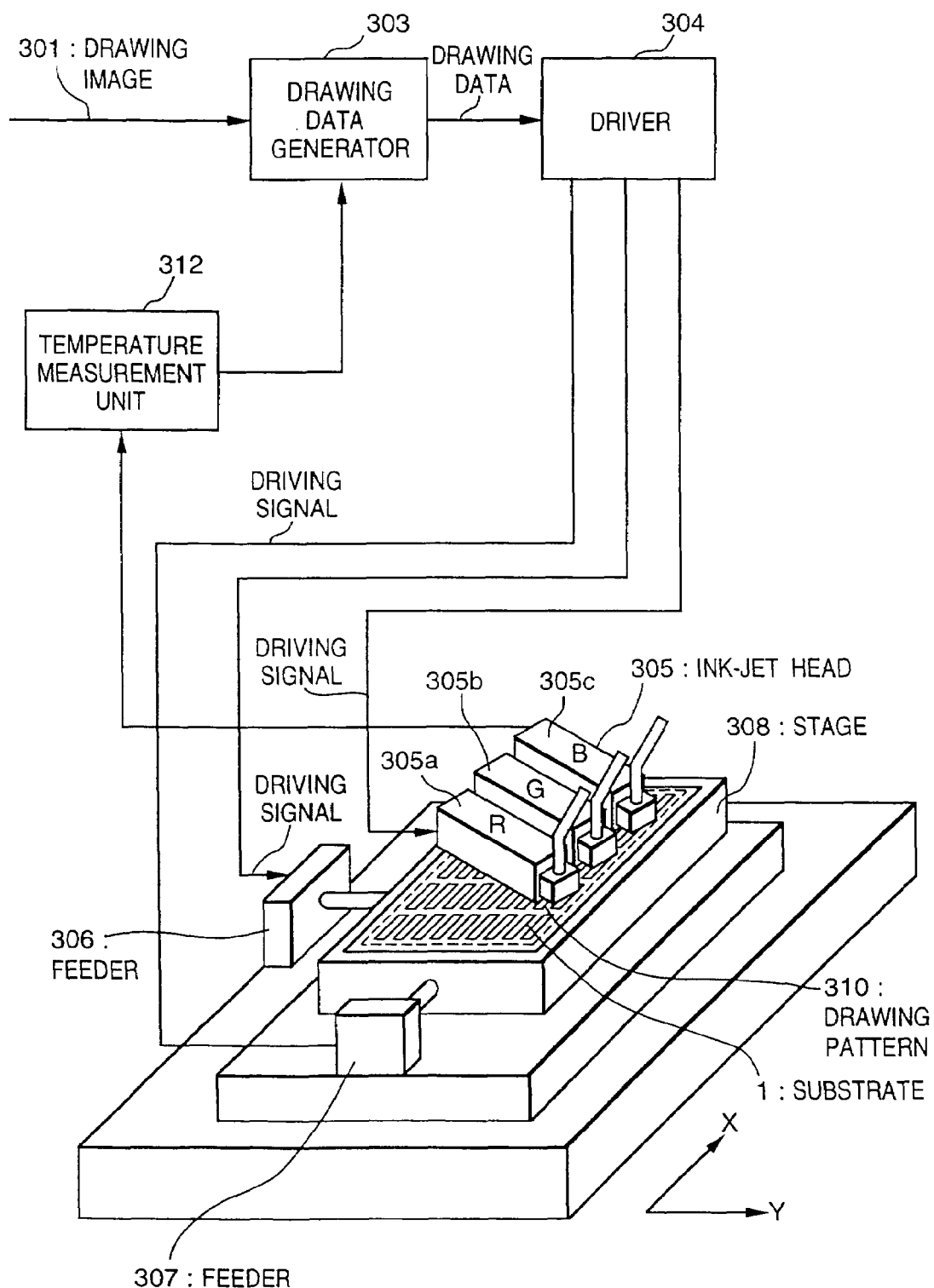
FIG. 27 is a view showing the arrangement of a color filter manufacturing apparatus of the seventh embodiment of the present invention.

FIG. 27 shows the arrangement of a color filter manufacturing apparatus of the seventh embodiment. In this embodiment, the temperature distribution of each nozzle of each ink-jet head is measured, and nozzle switching is performed in accordance with the measurement result.

In the color filter manufacturing apparatus, the layouts of ink dots drawn in coloring operations are identical to each other, and a change in the temperature of each nozzle in use exhibits almost a constant pattern. In addition, temperature environments such as external temperatures are almost constant in many instances. For this reason, the temperature of each nozzle can be estimated from the operating time of the nozzle. In this embodiment, the temperature of each nozzle is actually measured to perform nozzle switching. However, almost the same effect can be obtained by using a method of performing nozzle switching at predetermined intervals without actually measuring the temperature of each nozzle.

In the above embodiments, since a rise in the temperature of each nozzle is suppressed, a discharge failure due to scorching of an ink or the like can be prevented. In addition, since an idle time is set for each nozzle after a predetermined operating time, the service life of the nozzle is prolonged.

In the above embodiments, the black matrix 2 is formed on the substrate 1. However, the present invention is not limited to this. For example, in FIGS. 3A to 3F, the black matrix 2 may be formed on the other substrate which opposes the glass substrate 1. In this case, an ink is discharged into the frame of each portion 5 having no affinity for an ink in FIG. 2D.

In the above embodiments, as each ink-jet head, a bubble-jet type ink-jet head is used, in which an ink on the heater 102 is boiled to produce a bubble, and the ink is pushed and discharged from the discharging opening 108 upon volume expansion of the bubble. However, the present invention is not limited to this. For example, an ink-jet head using a piezoelectric element may be used.

According to the above description, the present invention is applied to the print apparatus of the system, among various ink-jet recording systems, which has a means (e.g., an electrothermal converter or laser light) for generating heat energy as energy used to discharge an ink, and changes the state of an ink by using the heat energy. According to this system, a high-density, high-definition recording operation can be realized.

As for the typical structure and principle, it is preferable that the basic structure disclosed in, for example, U.S. Pat. No. 4,723,129 or U.S. Pat. No. 4,740,796 is employed. The above method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electrothermal converter disposed to face a sheet or a fluid passage which holds the fluid (ink) to a level higher than levels at which film boiling takes place are applied to the electrothermal converter in accordance with recording information so as to generate heat energy in the electrothermal converter and to cause the heat effecting surface of the recording head to take place film boiling so that bubbles can be formed in the fluid (ink) to correspond to the one or more drive signals. The enlargement/contraction of the bubble will cause the fluid (ink) to be discharged through a discharging opening so that one or more inks are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. No. 4,463,359 or U.S. Pat. No. 4,345,262 is employed. If conditions disclosed in U.S. Pat. No. 4,313,124 which is an invention relating to the temperature rising ratio at the heat effecting surface are employed, a satisfactory recording result can be obtained.

As an alternative to the structure (linear fluid passage or perpendicular fluid passage) of the recording head disclosed in each of the above inventions and having an arrangement that discharge ports, fluid passages and electrothermal converters are combined, a structure having an arrangement that the heat effecting surface is disposed in a bent region and disclosed in U.S. Pat. No. 4,558,333 or U.S. Pat. No. 4,459,600 may be employed. In addition, the following structures may be employed: a structure having an arrangement that a common slit is formed to serve as a discharge section of a plurality of electrothermal converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a recording head of the full line type having a length corresponding to the maximum width of a recording medium which can be recorded by the recording apparatus, either the construction which satisfies its length by a combination of a plurality of recording heads as disclosed in the above specifications or the construction as a single full line type recording head which has integrally been formed can be used.

In addition, the invention is effective for a recording head of the freely exchangeable chip type which enables electrical connection to the recording apparatus main body or supply of ink from the main device by being mounted onto the apparatus main body, or for the case by use of a recording head of the cartridge type provided integrally on the recording head itself.

It is preferable to additionally employ the recording head restoring means and the auxiliary means provided as the component of the present invention because the effect of the present invention can be further stabled. Specifically, it is preferable to employ a recording head capping means, a cleaning means, a pressurizing or suction means, an electrothermal converter, an another heating element or a sub-heating means constituted by combining them and a sub-emitting mode in which an emitting is performed independently from the recording emitting in order to stably perform the recording operation.

Although a fluid ink is employed in the above embodiments of the present invention, an ink which is solidified at the room temperature or lower, or an ink which is softened or liquified at the room temperature may be used. That is, any ink which is liquified when a recording signal is supplied may be used.

Furthermore, an ink which is solidified when it is caused to stand, and liquified when heat energy is supplied in accordance with a recording signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a recording signal so as to be discharged in the form of fluid ink, or an ink which is liquified only after heat energy is supplied, e.g., an ink which starts to solidify when it reaches a recording medium, can be adapted to the present invention. In the above case, the ink may be of a type which is held as fluid or solid material in a recess of a porous sheet or a through hole at a position to face the electrothermal converter as disclosed in Japanese Patent Laid-Open No. 54-56847 or Japanese Patent Laid-Open No. 60-71260. It is the most preferred way for the ink to be adapted to the above film boiling method.

As has been described above, according to the present invention, since an ink-jet head used in a general printer or an ink-jet head having a simple modification is used as an ink-jet head used to manufacture a color filter, a reduction in the cost of an ink-jet head can be attained. A reduction in the cost of a manufacturing apparatus can therefore be attained. In addition, the manufacturing cost per color filter can be reduced.

Since the amount of each ink used per color filter can be reduced, a more inexpensive color filter, a display device using the color filter, and an apparatus using the display device can be provided.

When one glass substrate is to be colored by performing a plurality of scanning operations, the discharging operation of each ink-jet head can be stabilized, and the occurrence of defective products can be suppressed. In addition, the color time required for one glass substrate can be shortened to increase the production per unit time. Therefore, a color filter manufacturing method and apparatus which can manufacture a color filter at a lower cost can be provided.

There is provided a color filter manufacturing apparatus which can stabilize the discharging operations of ink-jet heads, each having discharging nozzles arranged at a pitch matching with a pixel pitch, and suppress the occurrence of defective products to attain an increase in yield by shortening the idle time between scanning operations, during which each discharging nozzle of each ink-jet head discharges no ink, when the ink-jet heads are to be relatively scanned a plurality of numbers of times to color one substrate.

In addition, in each ink-jet head, nozzles to be used can be switched. Even if a failure occurs in a nozzle in use, the manufacture of a color filter can be continued by using another nozzle.

Furthermore, since the service life of each ink-jet head is prolonged as compared with a conventional ink-jet head used for a color filter, the frequency in replacing ink-jet heads decreases.

Moreover, the size and color density of each ink dot can be kept constant. According to the present invention, since a rise in the temperature of each nozzle is suppressed, a discharge failure due to scorching of an ink or the like can be prevented. In addition, since an idle time is set for each nozzle after a predetermined operating time, the service life of the nozzle is prolonged.

The present invention is not limited to the above embodiments and various changes and modifications can be made within the spirit and scope of the present invention. Therefore, to apprise the public of the scope of the present invention the following claims are made.

What is claime is:

1. A method of manufacturing a color filter having a plurality of colored pixels on a substrate by discharging an ink having a color other than black from an ink-jet head having a plurality of ink discharging nozzles while performing relative movement of the ink-jet head and the substrate, comprising the steps of:
   dividing the plurality of ink discharging nozzles for discharging an ink having a same color other than black into a plurality of nozzle groups, each of the nozzle groups comprising ink discharging nozzles which are arrayed discontinuously;
   coloring the pixels of one substrate by using only one nozzle group in the plurality of nozzle groups for the same color; and
   switching from the one nozzle group to an other nozzle group as a nozzle group to be used for the same color,
   wherein an operation of the switching in said switching step is not performed during coloring of the one substrate.

2. A method according to claim 1, further comprising the step of:
   adjusting relative positions of the pixels of the substrate and the nozzles of the other nozzle group switched by the switching operation.

3. A method of manufacturing a liquid crystal panel having a color filter having a plurality of colored pixels on a substrate by discharging an ink having a color other than black from an ink-jet head having a plurality of ink discharging nozzles while performing relative movement of the ink-jet head and the substrate, comprising the steps of:
   preparing the color filter, by:
   dividing the plurality of ink discharging nozzles for discharging an ink having a same color other than black into a plurality of nozzle groups, each of the nozzle groups comprising ink discharging nozzles which are arrayed discontinuously;
   coloring the pixels of one substrate by using only one nozzle group in the plurality of nozzle groups for the same color; and
   switching from the one nozzle group to an other nozzle group as a nozzle group to be used for the same color,
   wherein an operation of the switching in said switching step is not performed during coloring the one substrate, and
   sealing a liquid crystal compound between the prepared color filter and a counter substrate.

4. A method of manufacturing a color filter having a plurality of colored pixels on a substrate, comprising the steps of:
   performing relative movement of the substrate and ink-jet heads corresponding to different colors other than black, each of the ink-jet heads having a plurality of nozzle groups corresponding to a same color, each of the nozzle groups comprising a plurality of ink discharging nozzles which are arrayed discontinuously;
   forming the colored pixels having different colors by discharging different color inks from respective nozzle groups for respective different colors onto the pixels of the substrate while performing relative movement of the substrate and the ink-jet heads a plurality of times; and
   switching, for at least one of the different colors, from the one nozzle group to an other nozzle group as a nozzle group to be used,
   wherein, in coloring one substrate by plural relative movements in said forming step, respective inks having different colors are discharged by using only one nozzle group of respective nozzle groups for respective different colors in the plural relative movements, and
   wherein an operation of the switching in said switching step is not performed during coloring of the one substrate.

5. A method according to claim 4, further comprising the step of:
   adjusting relative positions of the pixels of the substrate and the nozzles of an other nozzle group.

6. A method of manufacturing a liquid crystal panel having a color filter, comprising:
   preparing the color filter to have a plurality of colored pixels on a substrate by:
   performing relative movement of the substrate and ink-jet heads corresponding to different colors other than black, each of the ink-jet heads having a plurality of nozzle groups corresponding to a same color, each of the nozzle groups comprising a plurality of ink discharging nozzles which are arrayed discontinuously;
   forming the colored pixels having different colors by discharging different color inks from respective nozzle groups for respective different colors onto the pixels of the substrate while performing relative movement of the substrate and the ink-jet heads a plurality of times; and
   switching, for at least one of the different colors, from the one nozzle group to an other nozzle group as a nozzle group to be used,
   wherein, in coloring one substrate by plural relative movements in said forming step, respective inks having different colors are discharged by using only one nozzle group of respective nozzle groups for respective different colors in the plural relative movements, and
   wherein an operation of the switching in said switching step is not performed during coloring of the one substrate, and
   sealing a liquid crystal compound between the color filter and a counter substrate.

7. A method of manufacturing a color filter having a plurality of colored pixels on a substrate by discharging an ink having a color other than black from an ink-jet head having a plurality of ink discharging nozzles while performing relative movement of the ink-jet head and the substrate, comprising the steps of:
   dividing the plurality of ink discharging nozzles for discharging an ink having a same color other than black into a plurality of nozzle groups, the plurality of nozzle groups including at least a first nozzle group and a second nozzle group, each nozzle group comprising ink discharging nozzles which are arrayed discontinuously;

coloring the pixels of one substrate by using only the first nozzle group for the same color;

switching from the first nozzle group to the second nozzle group as a nozzle group to be used for coloring the pixels;

adjusting relative positions of the pixels of the substrate and the nozzles of the second nozzle group; and coloring the pixels of an other substrate by using only the second nozzle group for the same color, wherein an operation of the switching in said switching step is not performed during coloring of the substrate.

8. A method according to claim 7, wherein the first nozzle group corresponds to positions of the pixels of the one substrate, and the second nozzle group does not correspond to the positions of the pixels of the one substrate, and the first nozzle group corresponds to positions of the pixels of the other substrate and the second nozzle group does not correspond to the positions of the pixels of the other substrate.

9. A method according to claim 7, wherein the nozzles of the first nozzle group consist of every predetermined number of nozzles and the nozzles of the second nozzle group consist of every predetermined number of nozzles, and each of the nozzles of the second nozzle group are arranged between the nozzles of the first nozzle group respectively.

10. A method of manufacturing a liquid crystal panel having a color filter having a plurality of colored pixels on a substrate by discharging an ink having a color other than black from an ink-jet head having a plurality of ink discharging nozzles while performing relative movement of the ink-jet head and the substrate, comprising the steps of:

preparing the color filter by:

dividing the plurality of ink discharging nozzles for discharging an ink having a same color other than black into a plurality of nozzle groups, the plurality of nozzle groups including at least a first nozzle group and a second nozzle group, each nozzle group comprising ink discharging nozzles which are arrayed discontinuously;

coloring the pixels of one substrate by using only the first nozzle group for the same color;

switching from the first nozzle group to the second nozzle group as a nozzle group to be used for coloring the pixels;

adjusting relative positions of the pixels of the substrate and the nozzles of the second nozzle group; and coloring the pixels of an other substrate by using only the second nozzle group for the same color, wherein an operation of the switching in said switching step is not performed during coloring of the substrate, and sealing a liquid crystal compound between the prepared color filter and a counter substrate.

* * * * *

UNITED STATES PATENT AND TRADEMARK OFFICE
CERTIFICATE OF CORRECTION

PATENT NO.        : 7,381,444 B2
APPLICATION NO. : 11/449813
DATED             : June 3, 2008
INVENTOR(S)       : Yoshihiro Shigemura et al.

It is certified that error appears in the above-identified patent and that said Letters Patent is hereby corrected as shown below:

TITLE PAGE [75] INVENTORS:

"Nobuhito Yamaguchi, Tokyo (JP);" and "Satoshi Wada, Machida (JP);" should read --Nobuhito Yamaguchi, Inagi (JP);-- and --Satoshi Wada, Machida (JP);--.

COLUMN 9:

Line 42, "in" should be deleted.

COLUMN 10:

Line 1, "is" should be deleted.

COLUMN 11:

Line 3, "eight" should read --eighth--.

COLUMN 30:

Line 2, "stabled." should read --stabilized.--.

COLUMN 31:

Line 17, "claime" should read --claimed--.
Line 32, "an other" should read --another--.

COLUMN 32:

Line 27, "an other" should read --another--.
Line 45, "an other" should read --another--.

COLUMN 33:

Line 10, "an other" should read --another--.

UNITED STATES PATENT AND TRADEMARK OFFICE
CERTIFICATE OF CORRECTION

PATENT NO. : 7,381,444 B2
APPLICATION NO. : 11/449813
DATED : June 3, 2008
INVENTOR(S) : Yoshihiro Shigemura et al.

It is certified that error appears in the above-identified patent and that said Letters Patent is hereby corrected as shown below:

<u>COLUMN 34</u>:

Line 19, "an other" should read --another--.

Signed and Sealed this

Twenty-fourth Day of March, 2009

JOHN DOLL
*Acting Director of the United States Patent and Trademark Office*